(12) United States Patent
Moriyama et al.

(10) Patent No.: US 8,919,220 B2
(45) Date of Patent: Dec. 30, 2014

(54) STEERING COLUMN APPARATUS

(75) Inventors: Seiichi Moriyama, Gunma (JP); Hiroshi Shibazaki, Gunma (JP); Kiyoshi Sadakata, Gunma (JP); Seiichi Hagiwara, Gunma (JP); Masajirou Watanabe, Gunma (JP)

(73) Assignee: NSK Ltd. (JP)

( * ) Notice: Subject to any disclaimer, the term of this patent is extended or adjusted under 35 U.S.C. 154(b) by 0 days.

(21) Appl. No.: 13/391,507

(22) PCT Filed: Jan. 20, 2012

(86) PCT No.: PCT/JP2012/051227
§ 371 (c)(1),
(2), (4) Date: Oct. 8, 2012

(87) PCT Pub. No.: WO2012/132505
PCT Pub. Date: Oct. 4, 2012

(65) Prior Publication Data
US 2013/0255430 A1    Oct. 3, 2013

(30) Foreign Application Priority Data

Mar. 31, 2011 (JP) ................................. 2011-077122
Aug. 11, 2011 (JP) ................................. 2011-175748
Nov. 9, 2011 (JP) ................................. 2011-245358

(51) Int. Cl.
| | |
|---|---|
| B62D 1/18 | (2006.01) |
| B62D 1/187 | (2006.01) |
| B62D 1/184 | (2006.01) |
| B62D 1/19 | (2006.01) |
| B60R 21/09 | (2006.01) |

(52) U.S. Cl.
CPC ............... B62D 1/187 (2013.01); B62D 1/184 (2013.01); B62D 1/195 (2013.01); B62D 1/197 (2013.01); B60R 21/09 (2013.01)
USPC ........................................... 74/493; 280/775

(58) Field of Classification Search
USPC ...................... 74/492, 493.495; 280/275, 277
See application file for complete search history.

(56) References Cited

U.S. PATENT DOCUMENTS 5,743,150 A * 4/1998 Fevre et al. ..................... 74/493
6,419,269 B1 * 7/2002 Manwaring et al. .......... 280/775
(Continued)

FOREIGN PATENT DOCUMENTS

| JP | 2001-322552 | 11/2001 |
| JP | 2002-087286 | 3/2002 |
| JP | 2010-052639 | 3/2010 |

*Primary Examiner* — Troy Chambers
*Assistant Examiner* — Zakaria Elahmadi
(74) *Attorney, Agent, or Firm* — Hartman Global IP Law; Gary M. Hartman; Michael D. Winter

(57) ABSTRACT

Construction is achieved wherein upward displacement of a steering column 6c during a secondary collision is prevented, and the distance D between the steering column 6c and the tip end section of an adjustment lever 18b is kept the same regardless of the up/down position of the steering wheel 1. The position of the adjustment lever 18b after rotation is maintained by the tip end section of a locking arm 40 that is provided on the base end section of the adjustment arm 18b engaging with a locking groove 42 of a locking piece 41 that is provided on a support plate section 23a. The direction of formation of the locking groove 42 is such that when the up/down position of the steering wheel 1 is in an upward position, the top end section of the locking groove 42 engages with the tip end section of the locking arm 40, and when the up/down position of the steering wheel 1 is in a downward position, the bottom end section of the locking groove 42 engages with the tip end section of the locking arm 40.

3 Claims, 34 Drawing Sheets

(56) References Cited

U.S. PATENT DOCUMENTS

| | | | |
|---|---|---|---|
| 7,267,025 B2* | 9/2007 | Ko et al. | 74/493 |
| 7,779,717 B2* | 8/2010 | Ozsoylu et al. | 74/493 |
| 8,011,268 B2* | 9/2011 | Okada et al. | 74/493 |
| 8,387,483 B2* | 3/2013 | Oh | 74/493 |
| 8,485,554 B2* | 7/2013 | Osuka et al. | 280/777 |
| 8,578,812 B2* | 11/2013 | Minamigata | 74/492 |
| 2005/0127656 A1* | 6/2005 | Sato et al. | 280/775 |
| 2006/0169089 A1* | 8/2006 | Ohtsu | 74/493 |
| 2006/0185462 A1* | 8/2006 | Berg et al. | 74/493 |
| 2006/0273568 A1* | 12/2006 | Manwaring et al. | 280/777 |
| 2009/0114055 A1* | 5/2009 | Stroud | 74/493 |
| 2009/0229399 A1* | 9/2009 | Ozsoylu et al. | 74/493 |
| 2010/0300237 A1* | 12/2010 | Ridgway et al. | 74/493 |

\* cited by examiner (A)

(B)

STEERING COLUMN APPARATUS

TECHNICAL FIELD

The present invention relates to a steering column apparatus that comprises a tilt mechanism for adjusting the up/down position of a steering wheel, and a mechanism for protecting the driver from impact during a secondary collision.

BACKGROUND ART

As illustrated in FIG. 30, a steering apparatus for an automobile is constructed so that rotation of a steering wheel 1 is transmitted to an input shaft 3 of a steering unit 2, and as the input shaft 3 rotates, a pair of left and right tie rods 4 are pushed or pulled, applying a steering angle to the front wheels. The steering wheel 1 is supported by and fastened to the rear end section of a steering shaft 5, and with this steering shaft 5 inserted in the axial direction through a cylindrical shape steering column 6, the steering shaft 5 is supported by the steering column 6 so as to be able to rotate freely. Moreover, the front end section of the steering shaft 5 is connected to the rear end section of an intermediate shaft 8 by way of a universal joint 7, and the front end section of this intermediate shaft 8 is connected to the input shaft 3 by way of a separate universal joint 9.

Conventionally, in this kind of steering apparatus, a tilt mechanism for adjusting the up/down position of the steering wheel 1 and/or or a telescopic mechanism for adjusting the forward/backward position of the steering wheel 1 according to the size and driving posture of the driver have been widely used. In order to construct the tilt mechanism, the steering column 6 is supported by the vehicle body 10 so as to be able to pivot around a pivot shaft 11 that is located in the width direction. Here, the width direction means the width direction of the vehicle, and corresponds to the left/right direction. A displacement bracket that is fastened to the portion of the steering column 6 near the rear end section is supported by a support bracket 12 that is supported by the vehicle body 10 such that the displacement bracket can displace in the up/down direction and forward/backward direction. Here, the forward/backward direction is the forward/backward direction of the vehicle.

In order to construct the telescopic mechanism that can displace in the forward/backward direction, the steering column 6 is constructed by combining an outer column 13 and an inner column 14 so as to be able to expand and contract freely in a telescopic manner, and the steering shaft 5 is constructed by combining an outer shaft 15 and an inner shaft 16 with a spline fit or the like such that torque can be freely transmitted, and so as to be able to expand and contract freely. In the example illustrated in the figure, in order to reduce the force required for operating the steering wheel 1, an electric power steering apparatus, having an electric motor 17 as the source of assist power, is also assembled in the steering apparatus.

In the case of having a tilt mechanism and telescopic mechanism, except for the case of electric powered mechanisms, the position of the steering wheel 1 can be adjusted and fastened in the adjusted position based on the operation of an adjustment lever. For example, JP2001-322552(A) discloses construction such as illustrated in FIG. 31 and FIG. 32 wherein based on the rotation of an adjustment rod 19 by an adjustment lever 18, a cam member 21 is caused to pivot and displace at the same time as the axial dimension of a cam apparatus 20 is caused to expand or contract. Moreover, JP2002-87286(A) discloses conventionally known construction of a cam apparatus whose axial dimension is expanded or contracted by an adjustment lever. In the case of the conventional construction illustrated in FIG. 31 and FIG. 32, the displacement bracket 22 that is fastened to the outer column 13a is engaged with or disengaged from the support bracket 12a based on the expansion or contraction of the cam apparatus 20. Furthermore, whether or not to allow the inner column 14a to slide with respect to the outer column 13a is switched based on the pivoting displacement of the cam member 21.

The adjustment rod 19 is inserted in the width direction through long holes 24 in the up/down direction that are formed in a pair of left and right support plate sections 23 of the support bracket 12a, and a long through hole 25 in the forward/backward direction that is formed in the displacement bracket 22. When adjusting the up/down position or forward/backward position of the steering wheel 1 (FIG. 30) that is supported by and fastened to the rear end section of the steering shaft 5a comprising an outer shaft 15a and inner shaft 16a, the adjustment lever 18 is pivoted in a specified direction (typically down), causing the dimension in the axial direction of the cam apparatus 20 to contract, which causes the cam member 21 to separate from the outer circumferential surface of the inner column 14a. The cam apparatus 20 comprises: a drive cam 26 that is supported by and fastened to the end section (left end section in FIG. 32) in the axial direction of the adjustment rod 19, which is able to displace along the long holes 24 in the up/down direction and rotate around its own center axis, the drive cam 26 being prevented from rotating and displacing in the axial direction relative to the adjustment rod 19, and a driven cam 27 that is supported by the middle section in the axial direction of the adjustment rod 19 such rotation and axial displacement relative to the adjustment rod 19 is possible.

Alternatively, as in the construction illustrated in FIG. 33, the cam apparatus 20a can be constructed such that the drive cam 26a is supported by the adjustment rod 19a, which can only displace along the long holes 24 in the up/down direction, and is prevented from rotating around its own center axis, such that the drive came 26a can rotate relative to the adjustment rod 19a, however, is prevented from axial displacement; and the driven cam 27a is supported such that relative rotation with respect to the adjustment rod 19a is suppressed, and axial displacement is possible.

In either construction, by rotating the adjustment lever 18 in a specified direction in order to adjust the up/down position or the forward/backward position of the steering wheel 1, as illustrated in FIG. 34A, a convex section 28 that is formed on the drive cam 26 (26a) engages with a concave section 29 that is formed on the driven cam 27 (27a), causing the dimension in the axial direction of the cam apparatus 20 to contract. In this state, the adjustment rod 19 (19a) causes the outer column to displace within the displaceable range inside the long holes 24 in the up/down direction and long hole 25 in the forward/backward direction. As a result, the position of the steering wheel 1, which is supported by and fastened to the rear end section of the steering shaft 5a that is supported inside the outer column 13a so as to be able to rotate freely, is adjusted. After the steering wheel 1 has been moved to a desired position, the adjustment lever 18 is pivoted in the opposite direction from the specified direction, and as illustrated in FIG. 34B, causes the convex section 28 that is formed on the drive cam 26 (26a) to engage with a stepped section 30 that is formed on the driven cam 27 (27a), which causes the dimension in the axial direction of the cam apparatus 20 (20a) to expand. In the case of the construction illustrated in FIG. 31 and FIG. 32, the outer circumferential surface of the inner column 14a is held at the same time by the cam member 21. On the other hand, in the case of the construction illustrated in FIG. 33, the inner diameter of the outer column 13a contracts. As a result, in either construction, the position of the steering wheel 1 after being adjusted is held.

Moreover, construction such as illustrated in FIG. 35 has been known wherein the steering apparatus comprises a mechanism for protecting the driver from impact that occurs during a secondary collision when the driver collides with the steering wheel during a collision accident of the vehicle. In this construction, when a secondary collision occurs, the entire length of the steering shaft 5b and the steering column 6a contract, lessening the impact due to this secondary collision. More specifically, at the same time that the entire length of these members 5b, 6a contracts, the support bracket 12b that supports the outer column 13a breaks away in the forward direction from the vehicle body 10 (FIG. 30), allowing the entire length of the steering column 6a to contract.

In the case of the construction illustrated in FIG. 35, when the inclination angle of the long holes 24a in the up/down direction with respect to a virtual plane A that is orthogonal to the center axis of the steering column 6a is taken to be $\alpha$, this inclination angle $\alpha$ is less than the inclination angle $\beta$ of the center axis of the steering column 6a with respect to the forward/backward direction B (installation angle with respect to the vehicle body) ($\alpha<\beta$).

When the inclination angle $\alpha$ of the long holes 24 in the up/down direction is less than the installation angle $\beta$ of the steering column 6a, there is a possibility that, due to the engagement between the adjustment rod 19b and the long holes 24a in the up/down direction, the steering column 6a will displace upward along these long holes 24a in the up/down direction during a secondary collision. In other words, a component of force in a direction that is orthogonal to the center axis of the steering column 6a occurs due to the impact load during a secondary collision. When the installation angle $\beta$ is greater than the inclination angle $\alpha$, this component force becomes larger, and when a force acts that is greater than the tightening force between the adjustment rod 19b and the cam apparatus 20 (20a), the adjustment rod 19b displaces upward along the long holes 24a in the up/down direction, and that may cause the steering column 6a to displace upward.

In this way, there is a possibility that as the steering column 6a displaces upward, the collision position of the airbag that is provided in the steering wheel 1 and the driver will be shifted from the proper position, and that a sufficient effect of reducing the impact by the airbag will not be obtained. Particularly in the case of a small driver, there is a possibility that the head of the driver will not be supported by the airbag. Moreover, there is a possibility that the force that acts during a secondary collision will not be efficiently transmitted in a direction that causes the entire length of the steering column 6a to contract, and so absorbing the impact by the entire length of the steering column 6a contracting may not be performed smoothly, or the support bracket 13b may not break away smoothly from the vehicle body 10, resulting in unstable impact absorption.

JP2010-52639(A) discloses technology for preventing displacement in the upward direction of the steering column during a secondary collision, wherein as illustrated in FIG. 36, regardless of the up/down position of the steering wheel 1, the inclination angle $\alpha$ of the long holes 24b in the up/down direction with respect to a virtual plane A that is orthogonal to the center axis of the steering column 6b is made to be greater than the inclination angle $\beta$ of the center axis of the steering column 6b with respect to the forward/backward direction B ($\alpha>\beta$). With this kind of construction, even when a impact force is input to the adjustment rod 19b in a direction toward the vehicle-top side, in order to cause this adjustment rod 19b to displace toward the vehicle-top side, the adjustment rod 19b must be moved back toward the vehicle-rear side along the axial direction of the steering column 6b against the collapsing load that acts at the same time in the axial direction of the steering column 6b toward the vehicle-front side, and so it displacement of the outer column 13a toward the vehicle-top side is prevented and it becomes possible for the airbag to effectively receive and stop the driver.

However, the steering column apparatus that is disclosed in JP2010-52639(A) comprises a telescopic mechanism and a long hole 25 in the forward/backward direction is provided in the displacement bracket 22. Therefore, due to the impact load toward the vehicle-front side that occurs during a secondary collision, the steering column 6b begins to move against the tightening force from the vehicle installation bracket 12c toward the vehicle-front side. In other words, in a state where the friction on the tightening surface that clamps the steering column 6b against the vehicle installation bracket 12c changes from static friction to dynamic friction, the steering column 6b is prevented from displacing upward by the inclined long holes 24b in the up/down direction, so there is a possibility that the function for prevention upward displacement of the steering column 6b will decrease.

Moreover, in the steering column apparatus that is disclosed in JP2010-52639(A), the long holes 24b in the up/down direction are located on the vehicle-bottom side with respect to the center axis line of the steering column 6b. Therefore, the distance from the installation surface of the support bracket 12c for installation to the vehicle body to the adjustment rod 19 is long, and a prying force occurs in a locking capsule 34, so there is a possibility that the support bracket 12c will not break away smoothly from the vehicle body, and that the impact absorption will be unstable.

Furthermore, in the steering column disclosed in JP2010-52639(A), there is also the possibility that the following problems will occur. In other words, the adjustable state wherein the up/down position or the forward/backward position of the steering wheel 1 can be adjusted, and the state of maintain these positions is switched by expanding or contracting the dimension in the axial direction of the cam apparatus 20 (20a) described above. Of the drive cam 26 (26a) and driven cam 27 (27a) of the cam apparatus 20 (20a), one member is supported such that relative rotation with respect to the adjustment rod 19b is possible, and the other member is supported such that relative rotation is not possible. In the case of either construction, the driven cam 27 (27a) engages in the long holes 24b in the up/down direction such that only displacement along the long holes 24b in the up/down direction is possible.

Therefore, as illustrated in FIG. 36, when the up/down position of the steering wheel 1 is in an upward position, then as illustrated by the dot-dashed line x in FIGS. 34A and 34B, the phase of the driven cam 27 (27a) with respect to the drive cam 26 (26a) shifts, and in order to maintain the steering wheel 1 at the adjusted position, the adjustment lever 18a is rotated, the convex section 28 of the drive cam 26 (26a) is brought into contact with the stopper surface 39 of the driven cam 27 (27a), the amount that the adjustment lever 18a rotates before it can no longer rotate becomes small, and the distance D between the tip end section of the adjustment lever 18a and the steering column 6b becomes large.

On the other hand, when the up/down position of the steering wheel 1 is in a downward position, then as illustrated by the dot-dash line y in FIGS. 34A and 34B, the phase of the driven cam 27 (27a) with respect to the drive cam (26) (26a) shifts, the amount that the adjustment lever 18a rotates before it can no longer rotate becomes large (the possible angle of rotation becomes large), and the distance D between the tip end section of the adjustment lever 18a and the steering column 6b becomes small. In this way, the distance between the tip end section of the adjustment lever 18a and the steering column 6b in the state of maintaining the steering wheel 1 at the adjusted position fluctuates according to the up/down position of the steering wheel 1. In this kind of state, the amount that the adjustment lever 18a protrudes from the column cover that covers the steering column apparatus changes, and there is a possibility of giving the driver an uncomfortable feeling.

RELATED LITERATURE

Patent Literature

[Patent Literature 1] JP2001-322552(A)
[Patent Literature 2] JP2002-87286(A)
[Patent Literature 3] JP2010-52639(A)

SUMMARY OF THE INVENTION

Problem to be Solved by the Invention

In consideration of the problems described above, the object of the present invention is to provide a steering column apparatus that makes it possible for a support bracket that supports the steering column on the vehicle body smoothly break away from the vehicle body during a secondary collision, while preventing upward displacement of the steering column during a secondary collision. Furthermore, another object of the present invention is to achieve construction of an apparatus that can obtain this kind of effect wherein the distance between the steering column and the tip end section of the adjustment lever is the same regardless of the up/down position of the steering wheel.

Means for Solving the Problems

The steering column apparatus according to a first aspect of the present invention, comprises:
 a steering column, the front end section thereof being supported by the vehicle side so as to be able to pivot and displace around a pivot shaft that is arranged in the width direction, and this steering column supports a steering shaft on which a steering wheel is mounted such that the steering shaft can rotate;
 a displacement bracket that is fastened to the middle section in the axial direction of the steering column, and comprises a through hole that is formed in the width direction thereof;
 a support bracket comprising a pair of support plate sections and a pair of long holes in the up/down direction that are formed in positions of the pair of support plate section that are aligned with the through hole, the support bracket being supported by the vehicle side with the displacement bracket held between the pair of support plate sections;
 a rod shaped member that is inserted through the through hole and the pair of long holes in the up/down direction, so as to be capable of displacing along the long holes in the up/down direction;
 an adjustment lever that comprises a base end section that is connected to the end section of the rod shaped member, and a main portion that has a tip end section that is separated from the base end section, with this adjustment lever being able to rotate the rod shaped member; and
 a cam apparatus that is connected to the end section of the rod shaped member, and that by the dimension in the width direction thereof expanding or contracting according to the operation of the adjustment lever, is able to cause the space between the pair of support plate sections to expand or contact.

More specifically, the cam apparatus comprises: a drive cam that is supported by the end section of the rod shaped member such that displacement in the axial direction is suppressed, and can be rotated according to operation of the adjustment lever; and driven cam fits in one of the pair of long holes in the up/down direction such that displacement is only possible along that long hole in the up/down direction, and is supported by the middle section in the axial direction of the rod shaped member so that displacement in possible in the axial direction. This cam apparatus is such that as the drive cam rotates with respect to the driven cam, the dimension in the axial direction of the cam apparatus can expand or contract, causing the space between the pair of support plate sections to expand or contract.

In the steering column apparatus of the present invention, the steering column is supported by the vehicle side with this kind of construction so that adjustment of the up/down position of the steering wheel is possible, and so that forward displacement of the steering column during a secondary collision is possible.

Particularly, in the steering column apparatus of the present invention,
 the long holes in the up/down direction are inclined at a specified angle with respect to a virtual plane that is orthogonal to the center axis of the steering column, and elongates in a downward direction going in a direction toward the front;
 the specified angle is larger than the inclination angle of the center axis of the steering column with respect to the forward/backward direction regardless of the up/down position of the steering wheel;
 of the pair of support plate sections, a stepped stopper section is provide on the outside surface of the support plate section that faces the adjustment lever, and a locking arm that is provided on the base end section of the adjustment lever and comprises a tip end section so that when the adjustment lever is positioned such that the up/down position of the steering wheel can be maintained, the tip end section of the locking arm comes in contact with the stepped stopper section, and when the adjustment lever is positioned so that the up/down position of the steering wheel can be adjusted, the tip end section of the locking arm is separated from the stepped stopper section; and
 the direction of extension of the stepped stopper section is inclined at a specified angle with respect to the direction of extension of the long holes in the up/down direction, and by changing the position on the stepped stopper section where the tip end section of the locking comes in contact depending on the up/down position of the steering wheel, it is possible to keep the distance between the steering column and the tip end section of the adjustment lever constant when the adjustment lever is positioned so that the up/down position of the steering wheel can be maintained regardless of the up/down position of the steering wheel.

More specifically, a state of being able to maintain the up/down position of the steering wheel is a state wherein the adjustment lever is rotated in a specified direction (typically upward), the dimension in the axial direction of the cam apparatus is expanded, the space between the pair of support plate sections is contracted and the displacement bracket is held on both the left and right sides by these support plate sections. On the other hand, a state of being able to adjust the up/down position of the steering wheel is a state wherein the adjustment lever is rotated in the direction opposite to the specified direction (typically downward), the dimension in the axial direction of the cam apparatus is contracted, the space between the pair of support plate sections is expanded, and the pair of support plate sections separate from the displacement bracket.

Moreover, in this case, when the up/down position of the steering wheel is an upward position, the tip end section of the locking arm comes in contact with the top end section of the stepped stopper section; and when the up/down position of the steering wheel is a downward position, the tip end section of the locking arm comes in contact with the bottom end section of the stepped stopper section.

In the steering column apparatus of the present invention with this kind of construction, preferably a convex section is formed on the outside surface of the support plate section that faces the adjustment lever between the stepped stopper section and a flat section that the tip end section of the locking arm faces when the adjustment lever is positioned such that the up/down position of the steering wheel can be adjusted, and a locking groove that the tip end section of the locking arm engage with is formed between the convex section and the stepped stopper section, where both side surfaces of the convex section in the direction of rotation of the locking arm are inclined surfaces for making it easier for the tip end section of the locking arm to ride up on the convex section. With this construction, when the adjustment lever is positioned so that the up/down position of the steering wheel can be maintained, the tip end section of the locking arm that is provided on the base end section of the adjustment lever engages with the locking groove and holds the adjustment lever in that position.

In this case as well, when the up/down position of the steering wheel is an upward position, the tip end section of the locking arm engages with the top end section of the locking groove, and when the up/down position of the steering wheel is a downward position, the tip end section of the locking arm engages with the bottom end section of the locking groove.

Preferably, the rigidity of the locking arm is less than the rigidity of the main portion of the adjustment lever.

The steering column apparatus according to a second aspect of the present invention, as in an apparatus having conventional construction and in the apparatus of the first aspect of the invention, basically comprises a steering column, a support bracket, a rod shaped member, an adjustment lever and a cam apparatus, with the steering column being supported by the vehicle such that the position in the up/down direction of the steering wheel can be adjusted, and the such that steering column can displace in the forward direction during a secondary collision. Particularly, the steering column according to this second aspect is formed such that the long holes in the up/down direction are inclined toward the vehicle-rear side with respect to plane that is orthogonal to a straight line that connects the pivot center (center of the pivot shaft) of the steering column and the center of the rod shaped member.

Preferably, the steering column comprises an outer column, and an inner column that fits inside the outer column such that the outer circumferential surface of the inner column can slide over the inner circumferential surface of the outer column, and is such that when the space between the pair of support plate sections is expanded, the inner circumferential surface of the outer column is expanded, allowing the relative movement in the axial direction between the outer column and the inner column.

In both the first aspect and second aspect of the present invention, the steering column apparatus can comprise not only a tilt mechanism, but also a telescopic mechanism that makes it possible to adjust the forward/backward position of the steering wheel. In this case, preferably, together with forming long holes in the forward/backward direction in the outer column or the displacement bracket that is fastened to the outer column, a plurality of layered friction plates for telescopic motion are arranged between the head section, which is formed on the end section of both ends of the rod shaped member that is on the opposite side from the side that is connected to the adjustment lever, and the outside surface of the support plate section of the pair of support plate sections that faces the head section.

Effect of the Invention

With the steering column apparatus of the present invention constructed as described above, a rod shaped member is arranged further on the vehicle-top side than the center axis line of the steering column, and the long holes in the up/down direction for tilt adjustment are formed so as to be inclined toward the vehicle-rear side with respect to a plane that is orthogonal to a straight line that connects the pivot center of the steering column with the center of the rod shaped member. Therefore, even when an impact force toward the vehicle-top side is inputted to the rod shaped member by way of the steering column during a secondary collision, in order for this rod shaped member to displace toward the vehicle-top side, the rod shaped member must move back toward the vehicle-rear side against a collapse load that acts at the same time toward the vehicle-front side, so it is possible to effectively prevent upward displacement of the rod shaped member and the steering column. As a result, the airbag feature of receiving and stopping the driver during a collision can be effectively displayed.

Moreover, in the present invention, the distance from the installation surface of the support bracket on the vehicle side to the rod shaped member is short, so the possibility of a prying force occurring in the capsule for supporting the support bracket by the vehicle side so as to be able to break away toward the vehicle-front side during a secondary collision due to an impact load toward the vehicle-front side during a secondary collision is small, and the support bracket can smoothly break away from the capsule. As a result, the feature of lessening the impact load applied to the driver during a secondary collision can be effectively obtained.

Furthermore, with the present invention, it is possible to prevent upward displacement of the steering column during a secondary collision, and keep the distance between the steering column and the tip end section of the adjustment lever the same regardless of the up/down position of the steering wheel. Therefore, it is possible to prevent fluctuation in the distance between the tip end section of the adjustment lever and the steering column regardless of the up/down position of the steering wheel, and with the amount that the adjustment lever protrudes from the column cover that covers the steering column apparatus kept the same, it is possible to prevent giving the driver an uncomfortable feeling.

BRIEF DESCRIPTION OF THE DRAWINGS

FIG. 11A illustrates the state wherein the steering wheel is in an upward position, and FIG. 11B illustrates the state wherein the steering wheel is in a downward position.

BEST MODES FOR CARRYING OUT THE INVENTION

Embodiment 1

Example 1

FIG. 1 to FIG. 11B illustrate a first example of a first embodiment of the present invention. The feature of the steering column apparatus of this first embodiment of the present invention, including this example, is construction for preventing upward displacement of the steering column 6c during a secondary collision, wherein the distance D between the steering column 6c and the tip end section of a lever section 36 of the adjustment lever 18b is the same regardless of the up/down position of the steering wheel 1. In keeping this distance D the same includes the case of when there are small differences that are not large enough to give an uncomfortable feeling to the driver. The construction and functions of other parts are the same as in a conventionally known steering column apparatus, so drawings and explanations of equivalent parts are simplified or omitted, with the following explanation centering on the features of this example.

Figure 30:
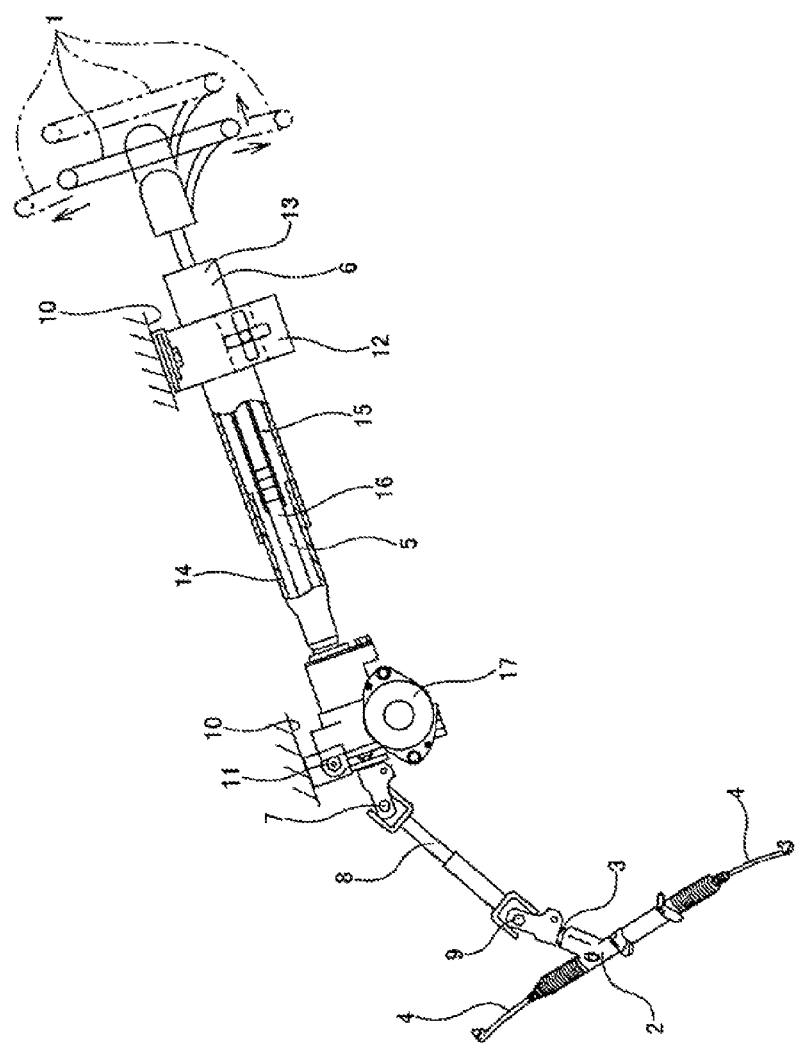
FIG. 30 is a partial cross-sectional side view of a conventionally known steering apparatus comprising a telescopic mechanism and tilt mechanism.
Figure 31:
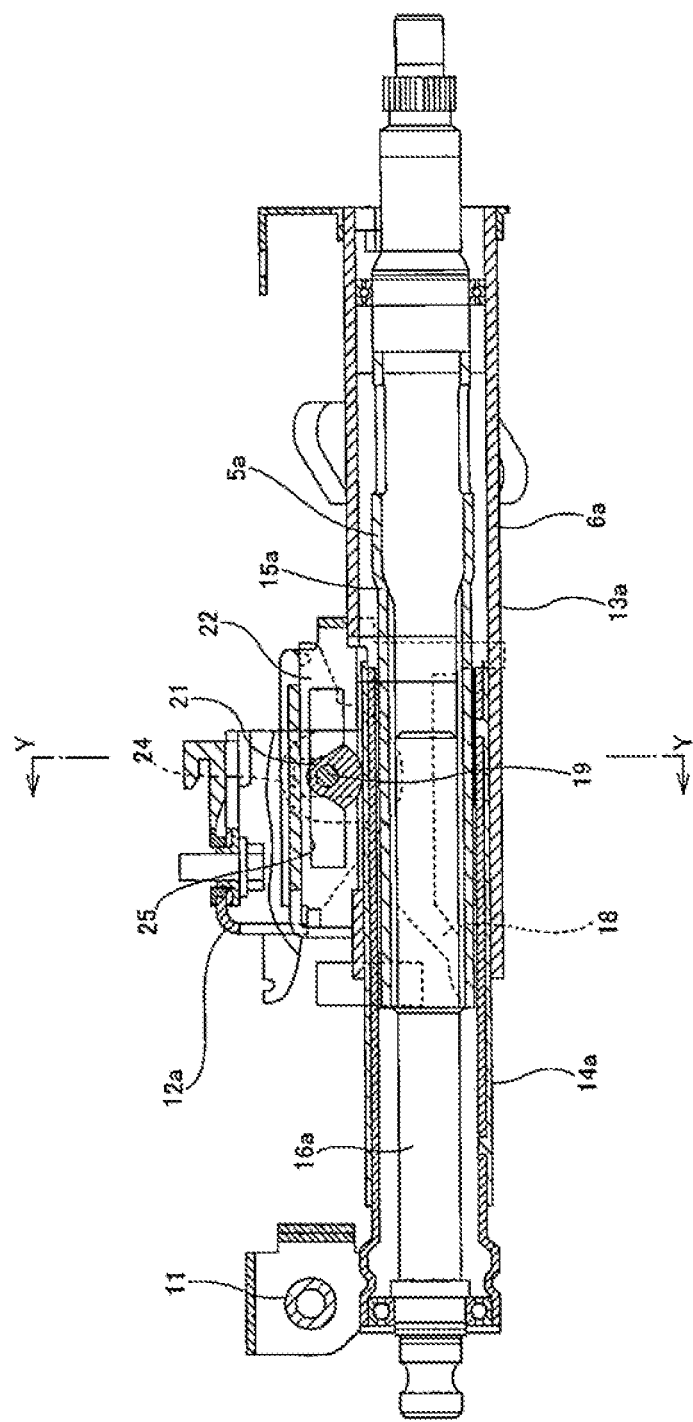
FIG. 31 is a vertical cross-sectional view illustrating a second example of conventional construction.
Figure 32:
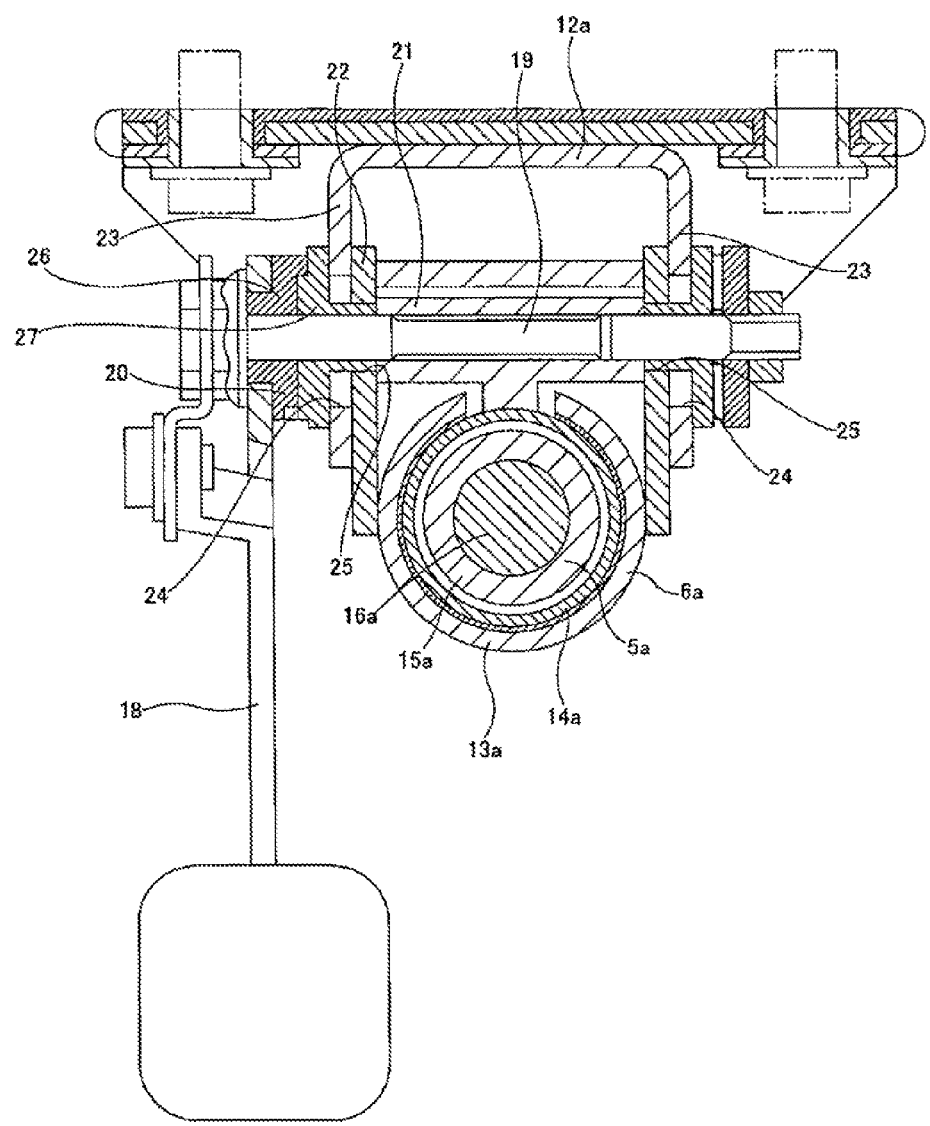
FIG. 32 is an enlarged cross-sectional view of section Y-Y in FIG. 31.
Figure 33:
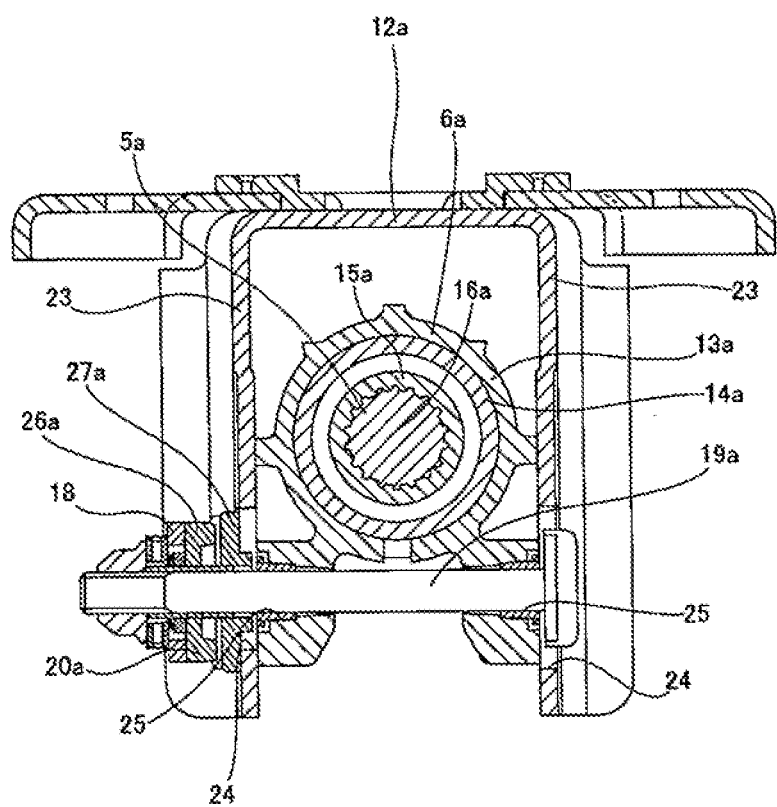
FIG. 33 illustrates a third example of conventional construction, and is a drawing similar to FIG. 32.
Figure 34:
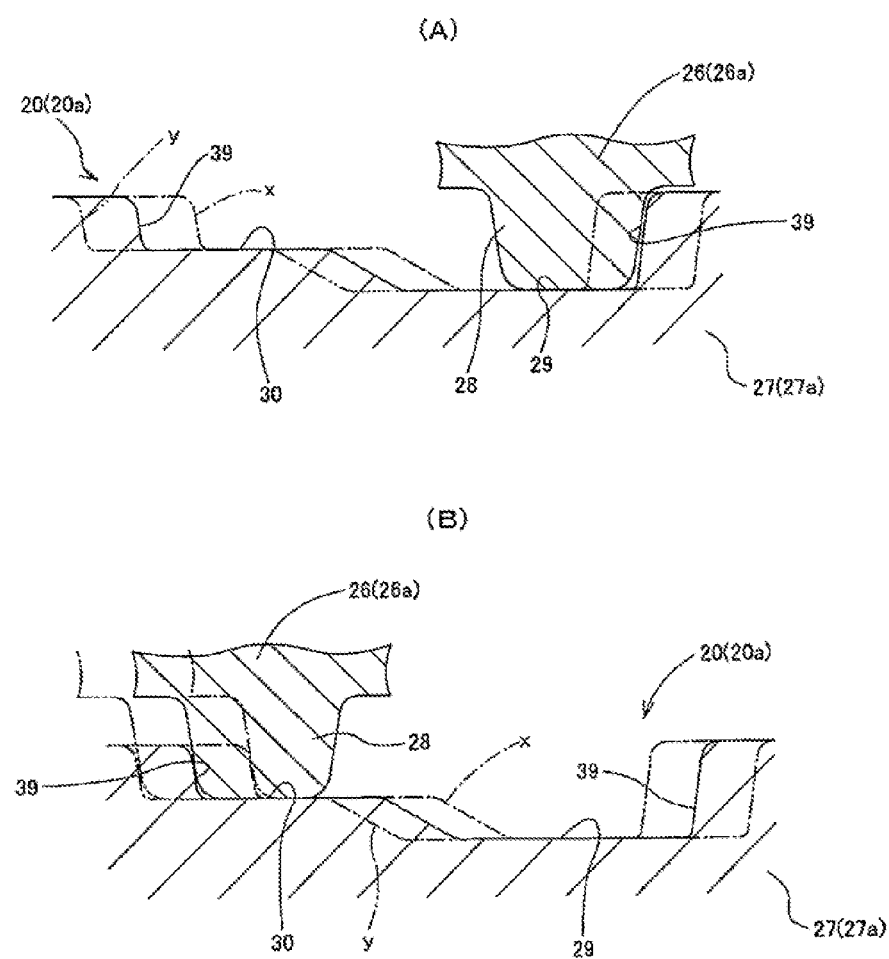
FIGS. 34A and 34B are schematic diagrams for explaining the operation of a cam apparatus.
Figure 35:
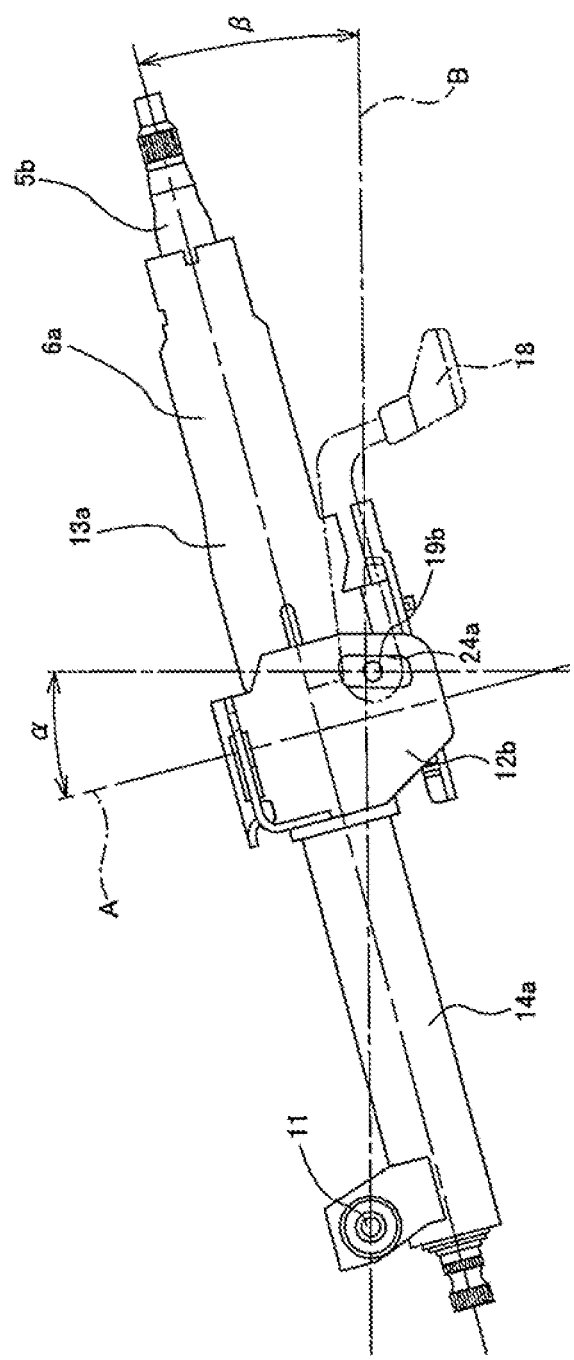
FIG. 35 is a side view illustrating a fourth example of conventional construction.
Figure 36:
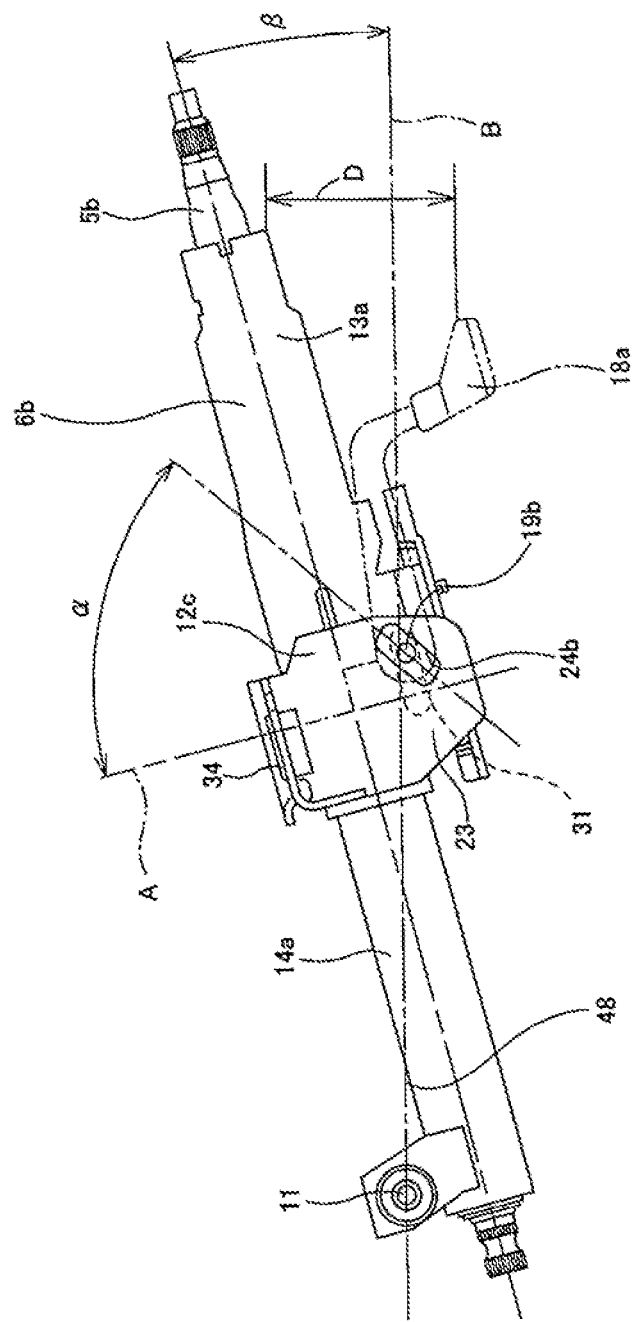
FIG. 36 is a side view of a fifth example of conventional construction, and illustrates the state with the steering wheel in an upward position.

In the construction of this example, the weight of the portion that is raised or lowered together with the steering column 6c is supported by a balance spring 33 that is located between a support bracket 12c, which is the portion that is fastened to the vehicle body 10 (FIG. 30), and a housing 32 that is supported by and fastened to the front end section of the steering column 6c, pivots with the steering column 6c and has a through hole 31 formed in the front end section thereof for inserting a pivot shaft 11 (FIG. 30). Therefore, even when adjusting the position of the steering wheel 1, the driver never has to support the entire weight of the steering column apparatus. Moreover, there is an energy absorbing member 35 located between the support bracket 12c that displaces in the forward direction together with the outer column 13b during a secondary collision, and a locking capsule 34 that does not displace in the forward direction during a secondary collision.

In the case of this example, by rotating downward the lever section (main portion) 36 of the bar shaped adjustment lever 18b, of which a base end section is connected to one end section of the adjustment rod 19b which is a rod shaped member, the lever section extending from the base end section to the tip end section that is separated from the base end section, the dimension in the axial direction of the cam apparatus 20b is contracted, and the outer column 13b is displaced within a range in which it is possible for the adjustment rod 19 to displace in the long holes 24b in the up/down direction that are formed in the support bracket 12c, and the long hole 25a in the forward/backward direction that is formed in the outer column 13b. As a result, the position of the steering wheel 1 that is supported by and fastened to the rear end section of the steering shaft 5b that is supported on the inside of this outer column 13 so as to be able to rotate freely is adjusted. After the steering wheel 1 has been moved to a desired position, the lever section 36 is rotated upward, expanding the dimension in the axial direction of the cam apparatus 20b. This cam apparatus 20b is such that the dimension in the axial direction expands or contracts as the lever section 36 of the adjustment lever 18b rotates. However, the cam apparatus 20b itself differs from the cam apparatus 20 (20a) of the conventional construction in that it does not have the function of regulating the amount of rotation of the adjustment lever 18b. The cam apparatus 20 also does not particularly have a feeling of clicking (feeling of restraint) even when the adjustment lever 18b has rotated to a point where the steering wheel can be maintained in the adjusted position as was disclosed in JP2002-87286(A).

In other words, as illustrated in FIG. 10A, in a state where the adjustment lever 18b has been rotated downward, the convex section 37 of the drive cam 26b faces the concave section of the driven cam 37b and the dimension in the axial direction of the cam apparatus 20b contracts. On the other hand, as illustrated in FIG. 10B, in the state were the adjustment lever 18b has been rotated upward, the convex section 37 of the drive cam 26b rides up on convex section 38 of the driven cam 27b and the dimension in the axial direction of the cam apparatus 20b expands. Even when the amount that the convex section 37 on the driving side rides up on the convex section 38 on the driven side is a minimum, and the steering wheel 1 is at the lowest position, the tip end surfaces of the convex section 37 on the driving side and the convex section 38 on the driven side come in contact with each other with a sufficient amount of surface area, so the expanded state of the dimension in the axial direction of the cam apparatus 20b can be sufficiently maintained.

The dimension in the axial direction of the cam apparatus 20b is expanded or contracted in this way, however, a stopper surface 39 that prevent the drive cam 26 (26a) from rotating beyond a specified angle with respect to the drive cam 27 (27a) as in the cam apparatus 20 (20a) of the conventional construction is not provided. Therefore, not only is it difficult to know whether or not the adjustment lever 18b has been rotated enough, in some cases, the adjustment lever 18b will be rotated too much, and the dimension in the axial direction of the cam apparatus 20 (20a) may contract again. Furthermore, even when the adjustment lever 18b has been rotated a proper amount, it is not possible to give the person operating the adjustment lever 18b a feeling of restraint.

In the case of this example, in order to regulate the amount of rotation of the adjustment lever 18b to a proper amount, and to give the operator of the adjustment lever 18b a feeling of constraint, and in order to maintain the rotated state at a position where the steering wheel 1 can be maintained at the adjusted position, a locking arm 40 is provided on the base end section of the adjustment lever 18b, and a locking piece 41 is provided on the outside surface of the support plate section 23a of the pair of support plate sections 23a that hold the outer column 13b on both sides in the width direction that faces the adjustment lever 18b.

By making the locking arm 40 narrower than the lever section 36, the rigidity is less than the remaining portion (main portion) of the adjustment lever 18 without this locking arm 40. The locking piece 41 is made by injection molding of synthetic resin, casting or forging of a metallic material such as a light alloy, or bending of metal plate, and is such that it is long in the same direction as the long holes 24b in the up/down direction, and has a locking groove 42. When the adjustment lever 18b has been rotated upward, the locking groove 42 engages and locks with the tip end section of the locking arm 40. Of both inside surfaces in the width direction of the locking groove 42, the height dimension of the inside surface that is on the opposite side from the long hole 24b in the up/down direction is large, and functions as a stepped stopper section 47. When the adjustment lever 18b has been rotated upward, the tip end section of the locking arm comes in contact with this stepped stopper section 47. Instead of providing a locking piece 41, it is also possible to directly provide just this stepped stopper section 47 on one of the support plate sections 23 of the pair of support plate sections 23a that are provided on both sides of the displacement bracket 22.

This kind of locking groove 42 is such that when the adjustment lever 18b is rotated upward and the tip end section of the locking arm of the adjustment lever 18b engages with the locking groove 42, the distance D between the tip end section of the lever section 36 of the adjustment lever 18b and the steering column 6c is always the same regardless of the up/down position of the steering wheel 1. Therefore, in this example, the locking groove 42 and the stepped stopper section 47 are formed so as to be inclined toward the rear (extend upward toward the rear) by a specified angle with respect to the long holes 24b in the up/down direction. When the steering wheel 1 has been moved to the top position, the top end section of the locking groove 42 engages with the tip end section of the locking arm, and preferably (particularly in the case when there is no locking groove 42), the tip end section of the locking arm 40 comes in contact with the top end section of the stepped stopper section 47.

In other words, as illustrated by the dot-dash line x in FIG. 10A, when the steering wheel 1 is at the top position, the phase of the driven cam 27b is shifted, however, as illustrated in FIG. 10B, the amount that the convex section 37 of the drive cam 26b rides up on the convex section 38 of the driven cam 27b becomes large. On the other hand, when the steering wheel 1 is in the bottom position, the bottom end section of the locking groove 42 engages with the tip end of the locking arm 40, and preferably (particularly in the case when there is no locking groove 42), the tip end section of the locking arm 40 comes in contact with the bottom end section of the stepped stopper section 47. In other words, as illustrated by the dot-dash line y in FIG. 10A, when the steering wheel 1 has been moved to the bottom position, the phase of the driven cam 27b shifts, however, as illustrated in FIG. 10B, the amount that the convex section 37 of the drive cam 26b rides up onto the convex section 38 of the driven cam 27b becomes small. With this kind of construction, the amount of rotation of the adjustment lever 18 does not change, so the distance D between the steering column 6c and the tip end section of the lever section 36 of the adjustment lever 18b is the same regardless of the up/down position of the steering wheel 1.

Moreover, as expressed by the dashed lines in FIG. 1, FIG. 2 and FIGS. 11A and 11B, when the adjustment lever 18b is rotated downward, the tip end section of the locking arm 40 lightly comes in contact with a flat surface 43 that is formed on the locking piece 41 due to the elastic force of the locking arm 40, and this keeps the adjustment lever 18b from being rotated more than necessary. As a result, the adjustment lever 18b does not hang down excessively. However, in the position, the construction for locking the locking arm 40 is not limited to this kind of flat surface 43, and other locking construction could also be employed. Furthermore, a triangular shaped convex section 45, which comprises a pair of inclined surfaces 44a, 44b that are inclined in the direction of rotation of the locking arm 40, is located between the locking groove 42 and the flat section 43. In other words, of both side surfaces in the direction of rotation of the convex section 45, the inclined surface section 44a on the locking groove 42 side is inclined in the direction that the height of the convex section 45 becomes greater in the direction toward the direction of movement of the locking arm 40 when the adjustment lever 18b is rotated downward, and the inclined surface section 44b on the flat section 43 side is inclined in the direction that the height of the convex section 45 becomes greater in the direction of movement of the locking arm 40 when the adjustment lever 18b is rotated upward. When there is no locking piece, triangular convex section 45, together with the stepped stopper section 47, can be directly formed on one of the support plate sections 23a of the pair of support plate sections 23a on both side of the displacement bracket 22.

In the case of the steering column apparatus of this example, it is possible to keep the distance D between the steering column 6c and the tip end section of the lever section 36 of the adjustment lever 18b the same regardless of the up/down position of the steering wheel 1. Therefore, it is possible to prevent giving the driver an uncomfortable feeling when the amount that the adjustment lever 18b protrudes from the column cover (not illustrated in the figures) that covers the steering column apparatus from changing due to fluctuation in the distance D.

Moreover, when the adjustment lever 18b is rotated downward in order to adjust the up/down position of the steering wheel 1, the tip end section of the locking arm 40 of the adjustment lever 18b comes in contact with the flat section 43 of the locking piece 41, so the adjustment lever 18b is not rotated more than necessary. Therefore, the operation of rotating the adjustment lever 18b upward after the steering wheel 1 has been moved to a desired position can be performed easily.

Furthermore, a comparatively steep inclined surface section 44a is formed on the convex section 45 between the locking groove 42 and flat section 43 on the locking groove 42 side of both sides in the direction of rotation of the lever 18b, and the width dimension of the bottom section of the locking groove 42 is equal to or less than the width dimension of the tip end section of the locking arm 40, so when the locking arm 40 and the locking groove 42 are engaged, it is possible to prevent loose movement of the adjustment lever 18b. It is also possible to prevent the adjustment lever 18b from accidentally rotating from the state of holding the steering wheel 1 in the adjusted position.

In addition, a comparatively gradual inclined surface section 44b is formed on the flat section 43 side of the convex section 45, so when the lever section 36 of the adjustment lever 18b is operated (rotated) upward after the steering wheel 1 has been moved to a desired position, it is possible to improve the operational feeling of the adjustment lever 18b by applying a proper amount of resistance against this rotation. The resistance against the rotation of the adjustment lever 18b can be adjusted by adjusting the inclination angles of the inclination surface sections 44a, 44b. Therefore, by adjusting the inclination angles of these inclination surface sections 44a, 44b, it is possible to tune the operational feeling of the adjustment lever 18b to correspond to the vehicle. It is also possible to form the inclined surface sections 44a, 44b as a combination of a plurality of inclined surfaces, or to make the cross-sectional shape of the inclined surfaces a partial circular arc shape.

The rigidity of the locking arm 40 of the adjustment lever 18b is less than that of the main section of the adjustment lever 18b, so when an impact load is applied when the knees of the driver collide with the tip end section of the lever section 36 of the adjustment lever 18b during a secondary collision, the locking arm 40 breaks off. Rotation of the adjustment lever 18b is allowed, and the knees that collided with the adjustment lever 18b are protected. The knees are protected by this locking arm 40 breaking off, so it is possible to sufficiently increase the rigidity of the remaining lever section 36 (main portion).

Embodiment 1

Example 2

Figure 1:
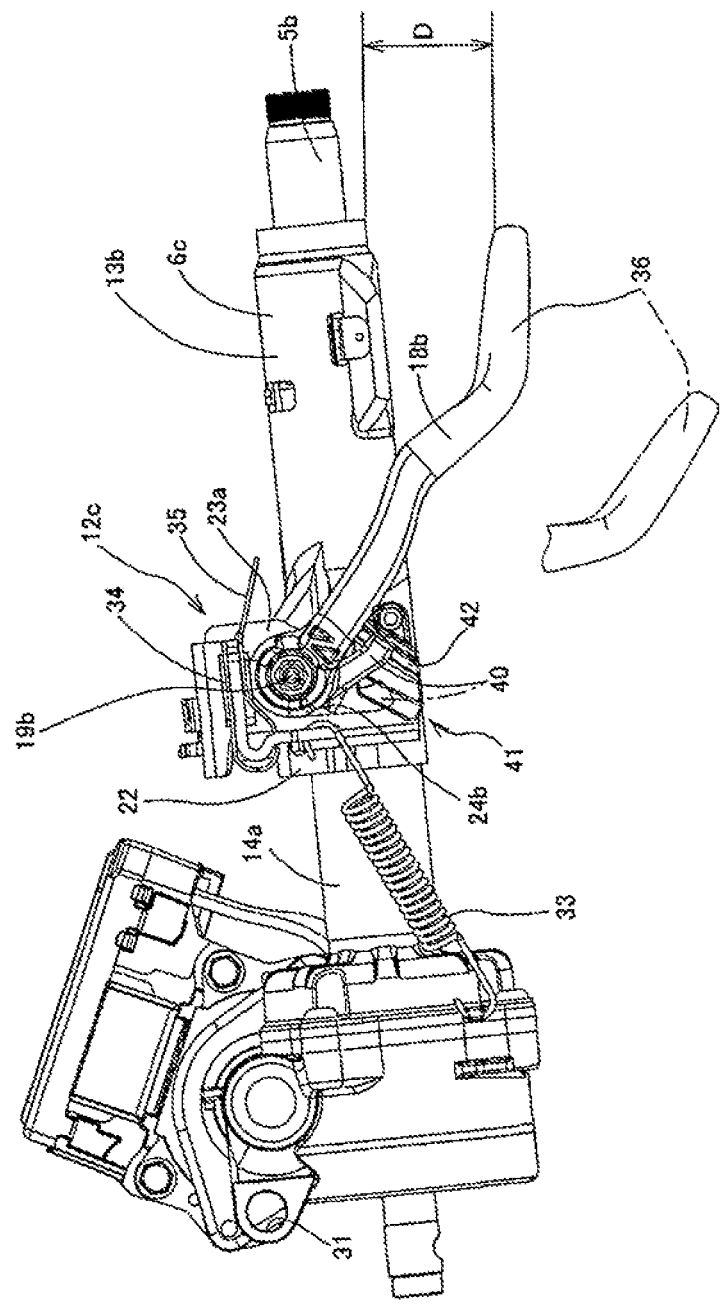
FIG. 1 is a side view illustrating a first example of a first embodiment of the present invention.
Figure 2:
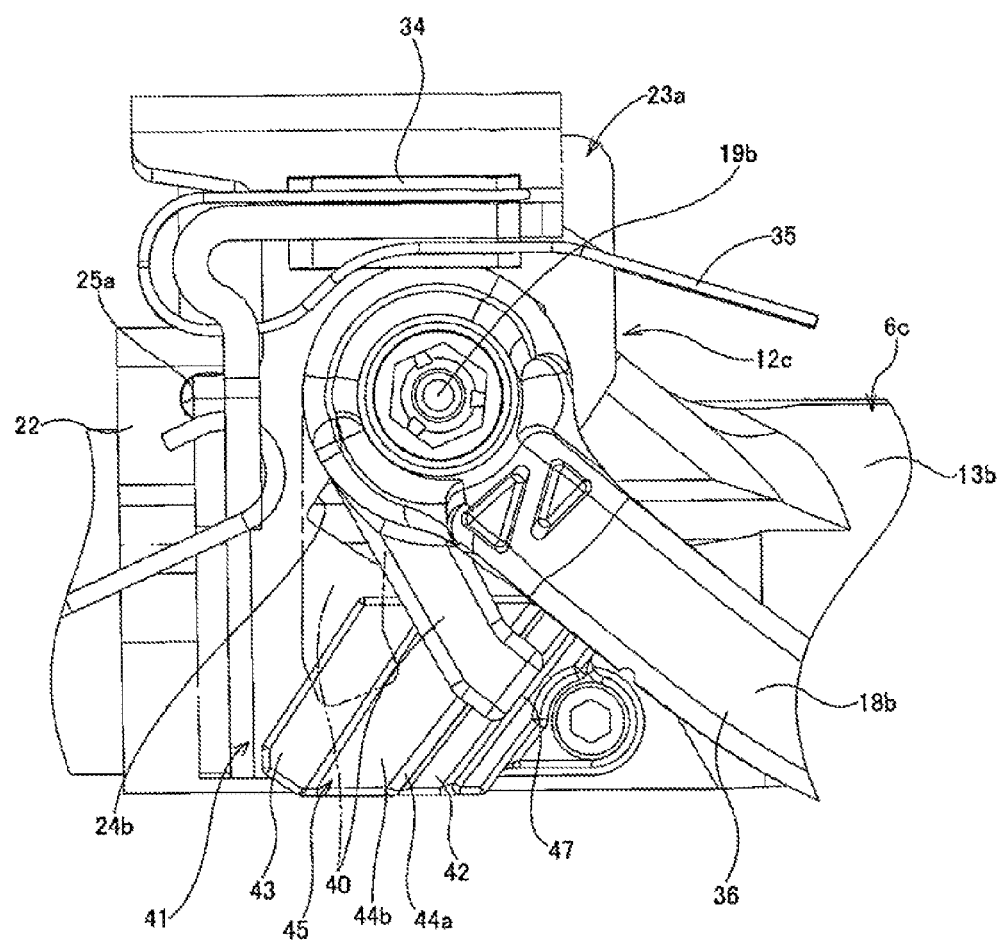
FIG. 2 is an enlarge view of the center section of FIG. 1.
Figure 3:
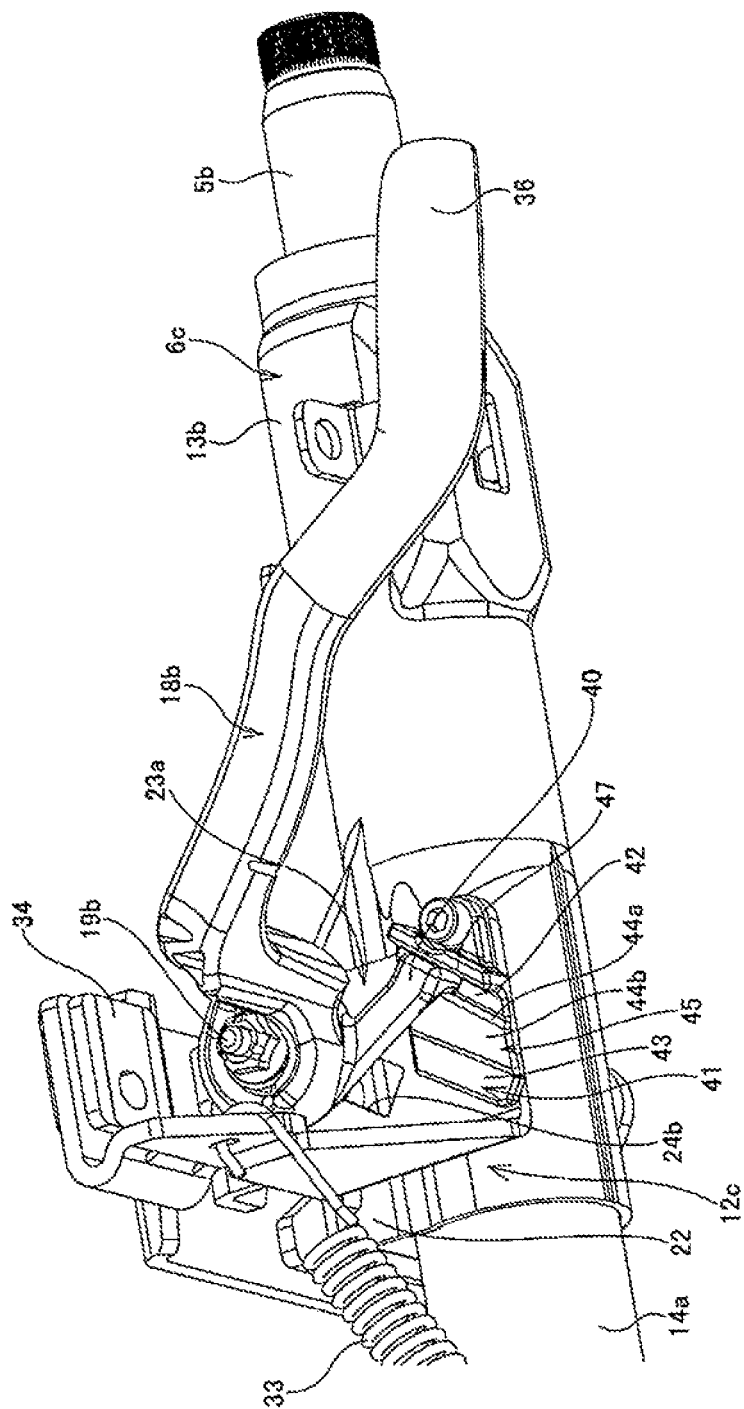
FIG. 3 is a perspective view of the right half in FIG. 1 as seen from below.
Figure 4:
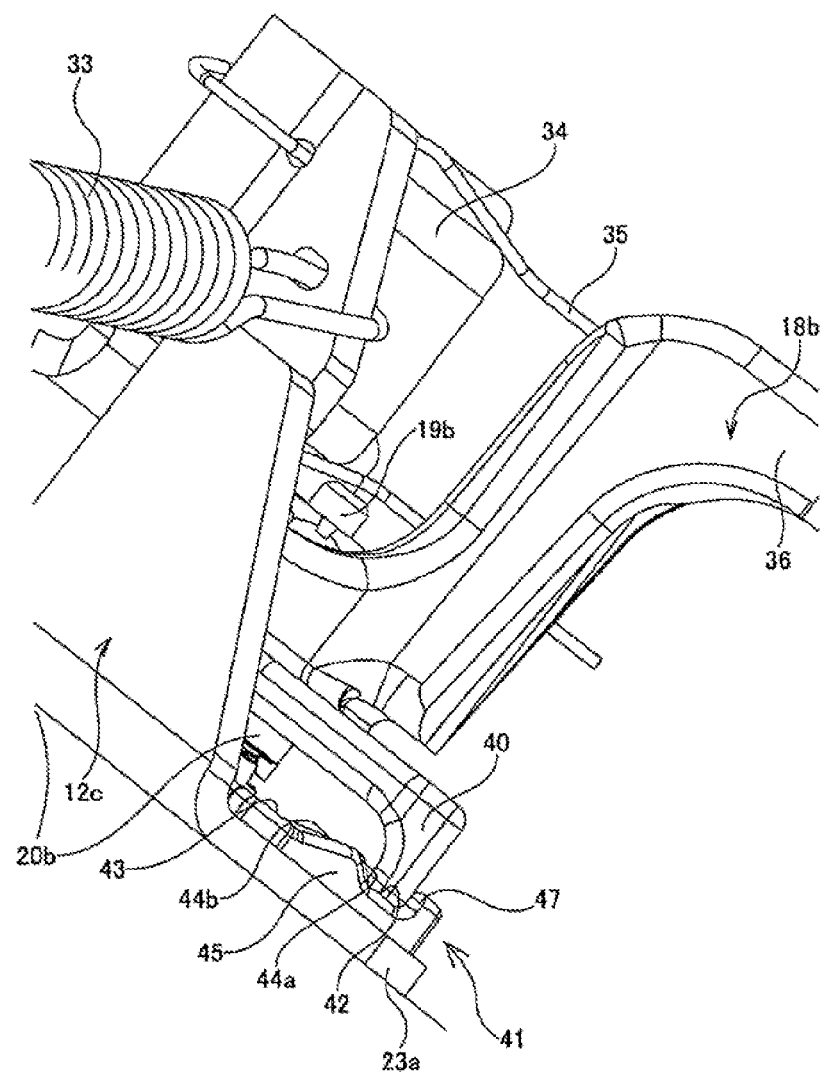
FIG. 4 is a perspective view of the main parts of the first example of the first embodiment as seen from below.
Figure 5:
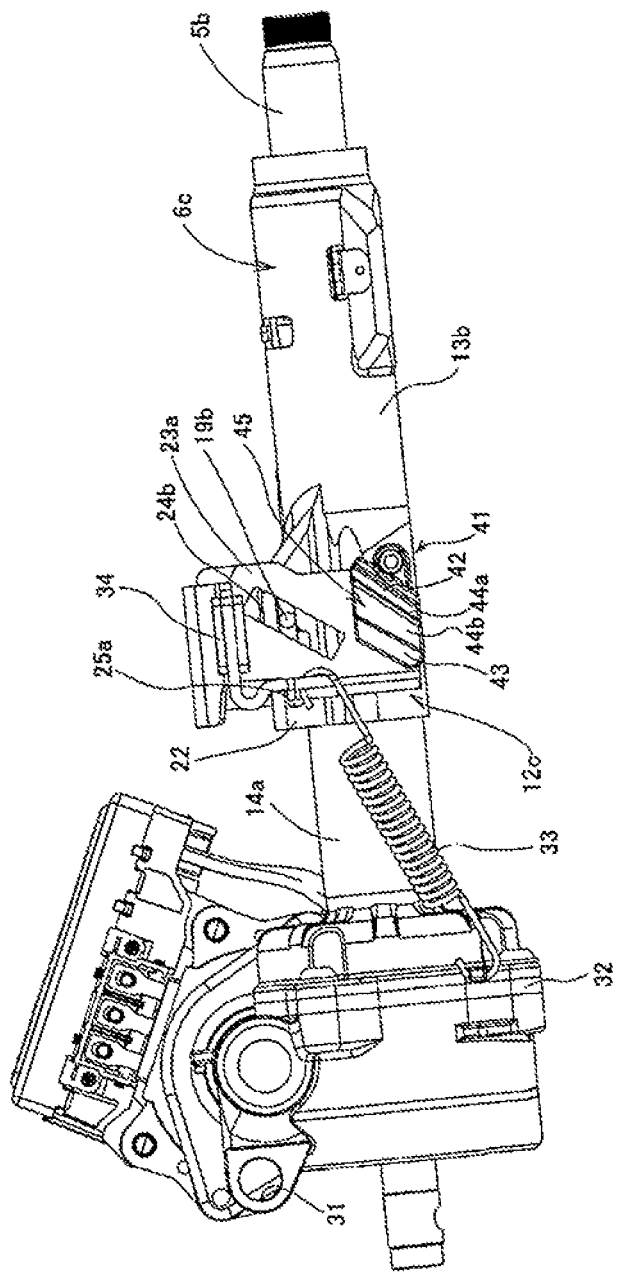
FIG. 5 is a side view of the first example of the first embodiment, and illustrates the state wherein the adjustment lever is removed.
Figure 6:
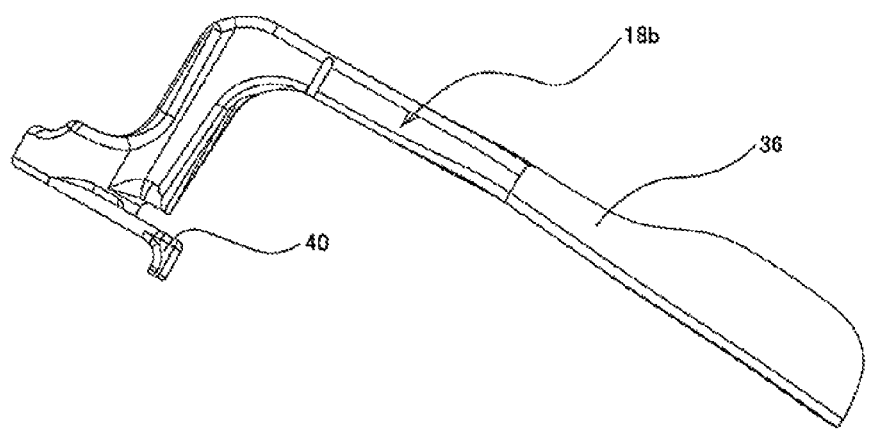
FIG. 6 is a perspective view of removed adjustment lever of the first example of the first embodiment as seen from below.
Figure 7:
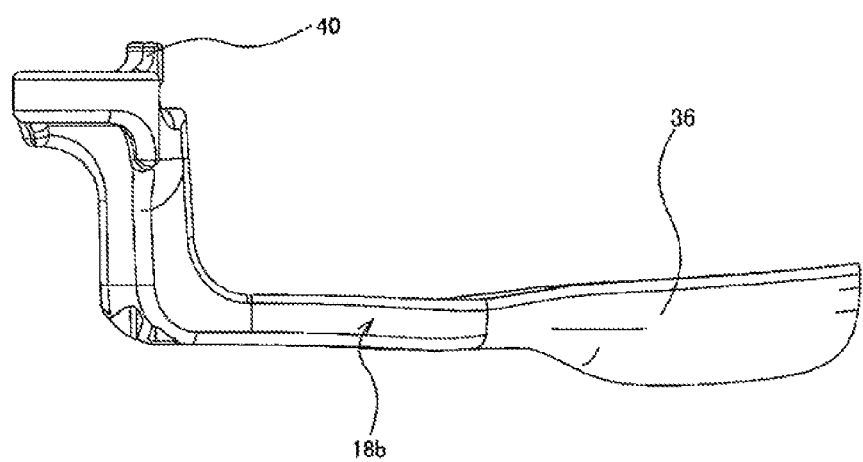
FIG. 7 is a top view of the adjustment lever illustrated in FIG. 6.
Figure 8:
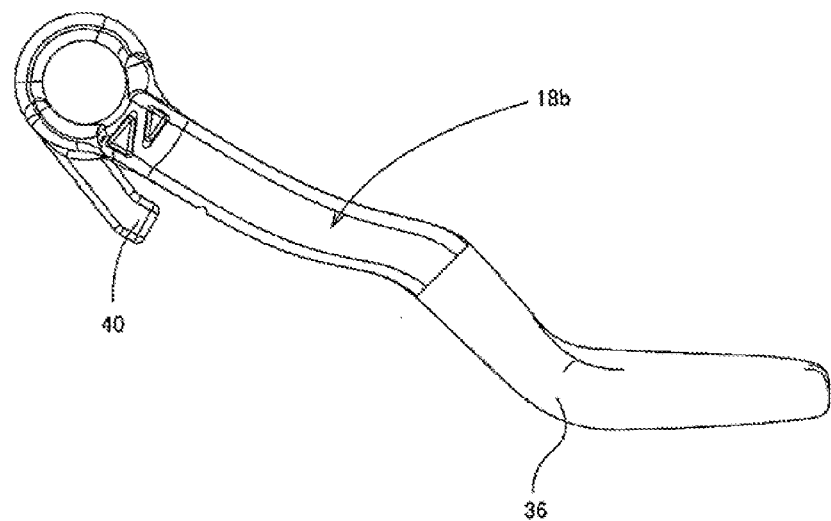
FIG. 8 is a side view of the adjustment lever illustrated in FIG. 6.
Figure 9:
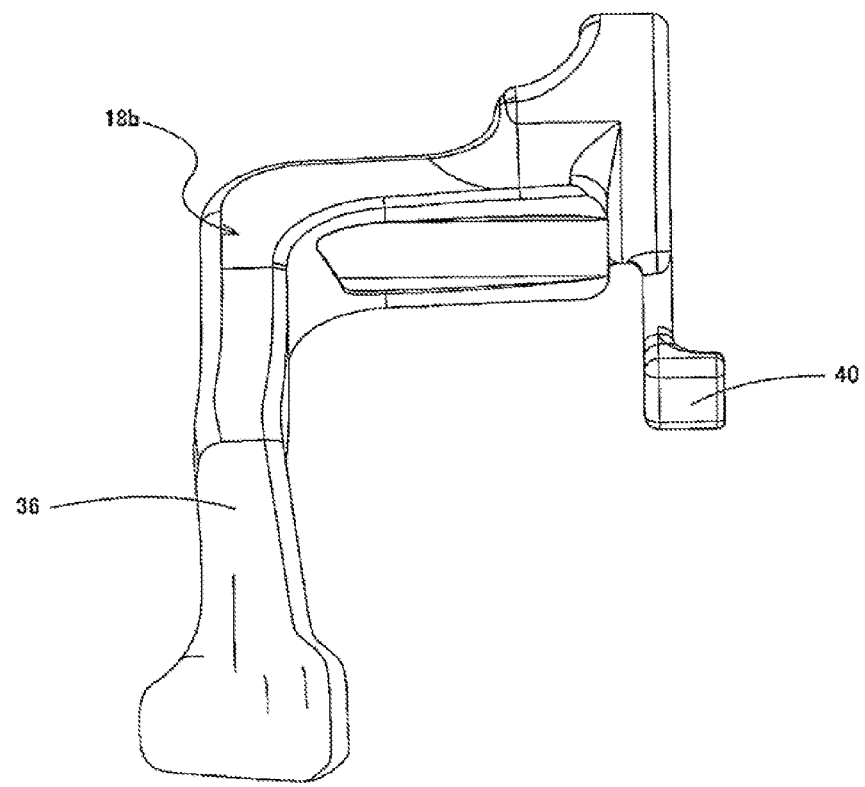
FIG. 9 is a drawing of the adjustment lever illustrated in FIG. 6 as seen from the rear.
Figure 10:
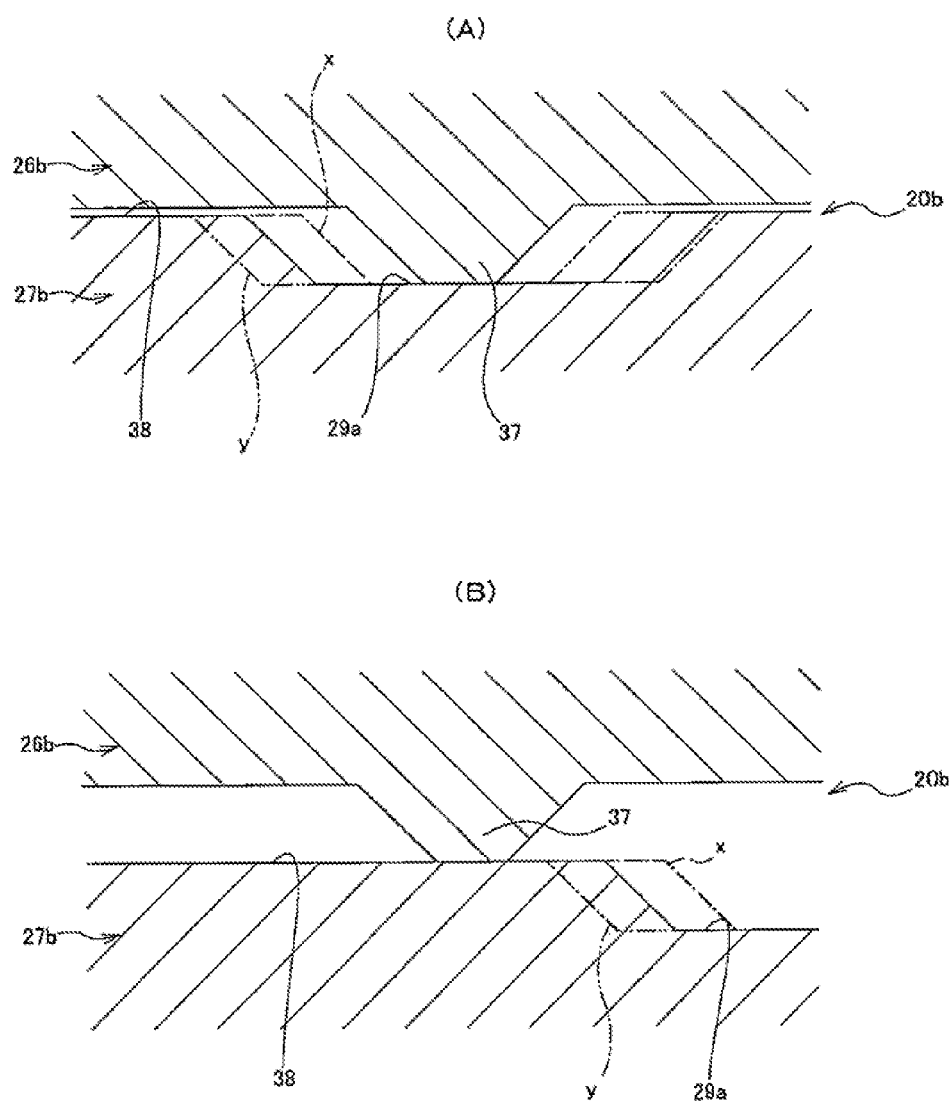
FIGS. 10A and 10B are schematic diagrams for explaining the operation of the cam apparatus that is assembled in the first example of the first embodiment.
Figure 11:
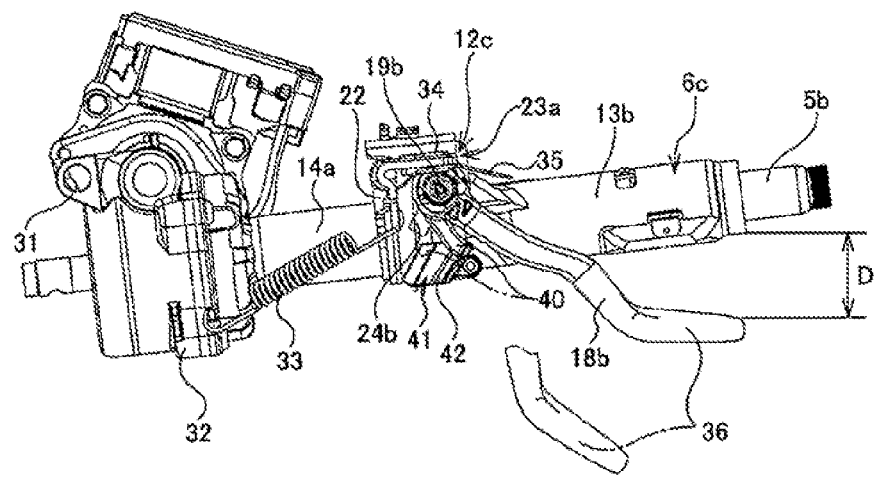
FIGS. 11A and 11B are side views of the first example of the first embodiment, where
Figure 11:
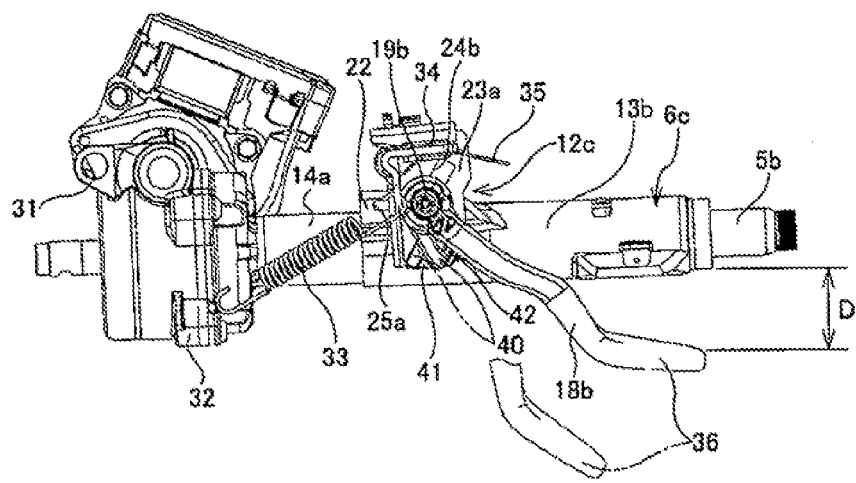
Figure 12:
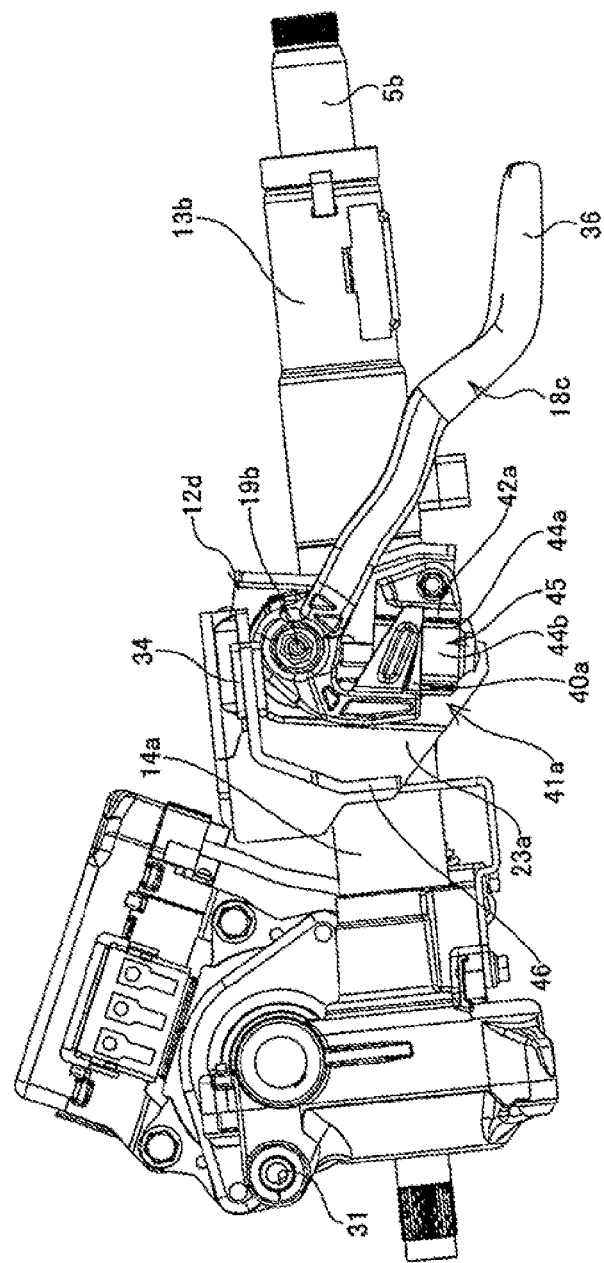
FIG. 12 is a side view illustrating a second example of the first embodiment of the present invention.
Figure 13:
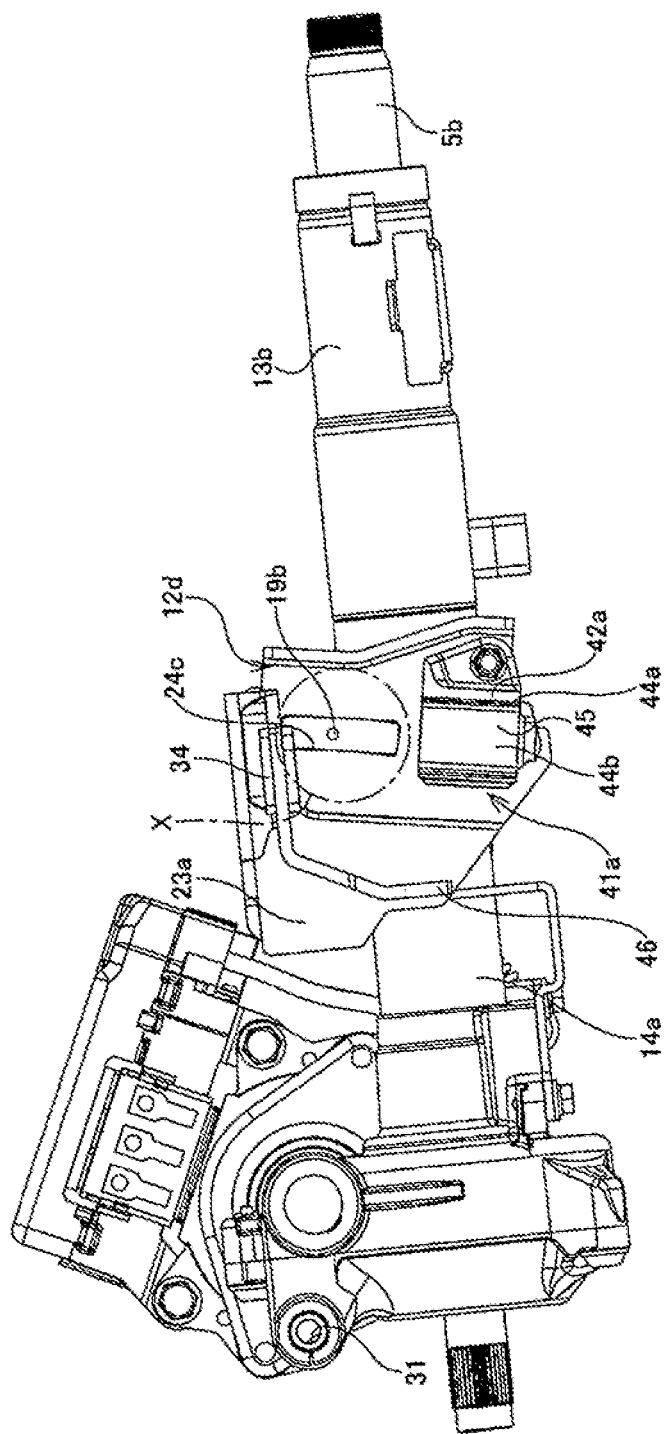
FIG. 13 illustrates the second example of the first embodiment, and is a drawing similar to FIG. 5.
Figure 14:
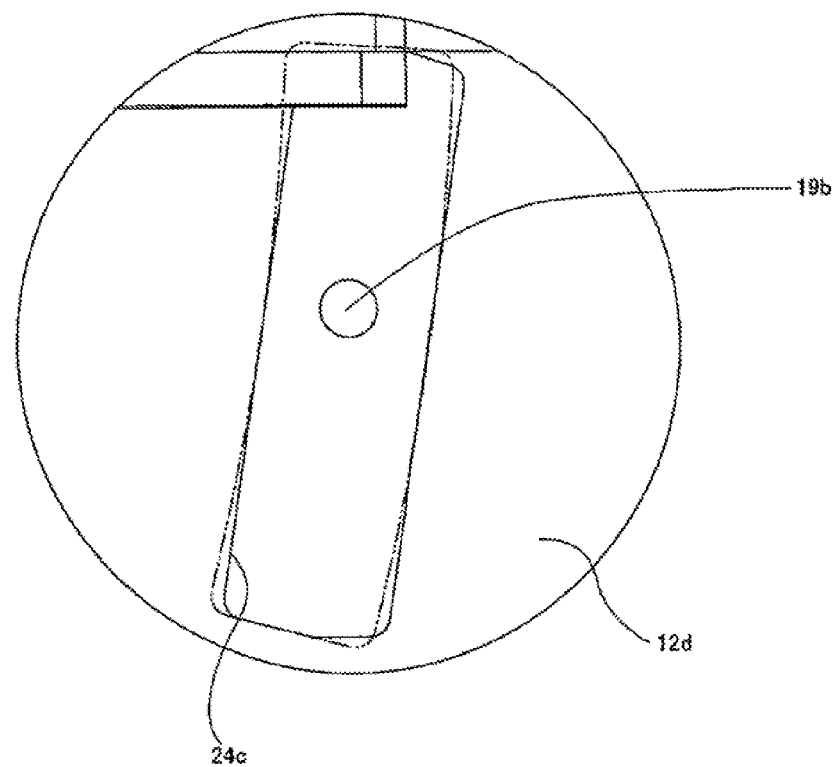
FIG. 14 is an enlarged view of area X in FIG. 13.
Figure 15:
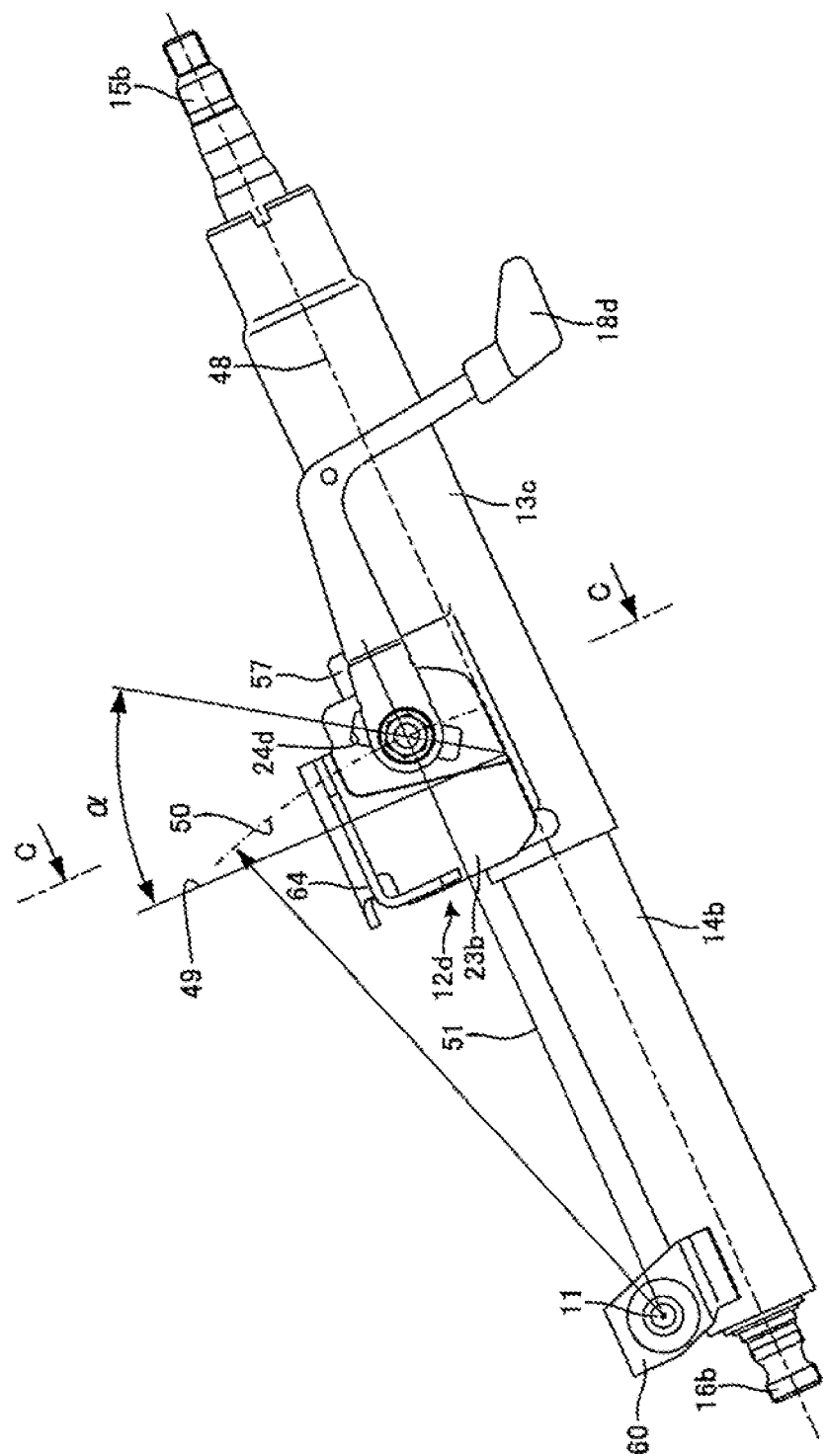
FIG. 15 is a front view illustrating the steering column apparatus of a first example of a second embodiment of the present invention.

FIG. 12 to FIG. 14 illustrate a second example of the first embodiment of the present invention. The steering column apparatus of this example comprises a tilt mechanism, however does not comprise a telescopic mechanism. In other words, there is no long hole 25b in the forward/backward direction (FIG. 5). Therefore, the outer column 13b can displace in the axial direction due to an impact load during a secondary collision, and can displace only a little in the axial direction due to adjustment of the up/down position along the long holes 24c in the up/down direction, however, forward/backward position adjustment cannot be performed independently from the up/down position adjustment.

In this example, by forming the upper half of the long holes 24c in the up/down direction so as to incline toward the rear with respect to the partial arc shaped long hole, which is formed around the pivot shaft (FIG. 30) that is inserted through the through hole 31, as expressed by the dashed line in FIG. 14, upward displacement of the steering column 6c is prevented. In order to correspond to the shape of the long holes 24c in the up/down direction, the shape of the locking arm 40a of the adjustment lever 18c and the shape of the locking groove 42a of the locking piece 41a differ from that of the first example of the first embodiment. Moreover, when the adjustment lever 18c is rotated downward in order to adjust the up/down position of the steering wheel 1 (FIG. 30), the locking arm 40a and the surface on the rear side of a downward suspended plate section 46 that is formed by bending the front portion of the support bracket 12d downward come in contact so that the adjustment lever 18c does not rotate more than necessary. The construction and functions of the other parts are the same as in the first example of the first embodiment.

For the steering column apparatus of the first embodiment, construction of providing a displacement bracket at the top of the steering column was explained, however, it is also possible to apply the first embodiment of the present invention to construction wherein this displacement bracket is provided on the bottom of the steering column. However, when the displacement bracket is provided at the bottom of the steering column, the distance from installation surface of the support bracket for installation on the vehicle body to the adjustment rod becomes long, and there is a possibility that a prying force will occur in the locking capsule due to an impact load toward the vehicle-front side during a secondary collision, the support bracket will not break away smoothly from the vehicle body and impact absorption will become unstable, so preferable the first embodiment of the present invention is applied to the construction wherein the displacement bracket is provided at the top of the steering column. Furthermore, preferably the first embodiment will be applied to the construction of the second embodiment explained below.

Embodiment 2

Example 1

FIG. 15 to FIG. 18 illustrates a first example of a second embodiment of the present invention. In this example, the outer column 13c that is capable of sliding in the axial direction fits around the outer circumference of the inner column 14b that is located on the vehicle-front side. The outer shaft (upper steering shaft) 15b is supported by the outer column 13c so as to be able to rotate, and the steering wheel 1 is fastened to the vehicle-rear side (right end in the figure) of the outer shaft 15b. In this example, the outer column 13c is integrally molded by die casting an aluminum alloy, however, the displacement bracket (distance bracket) can be welded to steel pipe. Moreover, with the objective of lessening the weight, the outer column 13d can be formed by die casting a magnesium alloy.

A support bracket (vehicle installation bracket) 12d is attached to the vehicle-front side (left side in the figure) of the outer column so that the outer column 13c is held on both left and right side. The support bracket 12d is attached by way of a capsule 68 made of an aluminum alloy or the like that is fastened to the vehicle body (FIG. 16) such that it can break away toward the vehicle-front side.

The outer column 13c is such that when a the driver collides with the steering wheel during a secondary collision and a large image load acts, the support bracket 12d breaks away from the capsule 68 toward the vehicle-front side, and the outer column 13c is guided by the inner column 14b and collapses toward the vehicle-front side, absorbing impact energy.

A lower bracket 60 is integrally fastened to the vehicle-front side (left side) of the inner column 14b. The lower bracket 60 is supported by the vehicle body 67 by way of a pivot shaft (pivot pin) 11 so as to be able to tilt. The inner shaft (lower steering shaft) 16b is supported by the inner column 14b such that it can rotate freely, and the vehicle-rear side of the inner shaft 16b fits with the vehicle-front side of the outer shaft 15b by way of a spline fit. The inner shaft 16b is connected to the steering unit 2 by way of an intermediate shaft 8, and can change the steering angle of the wheels.

Figure 16:
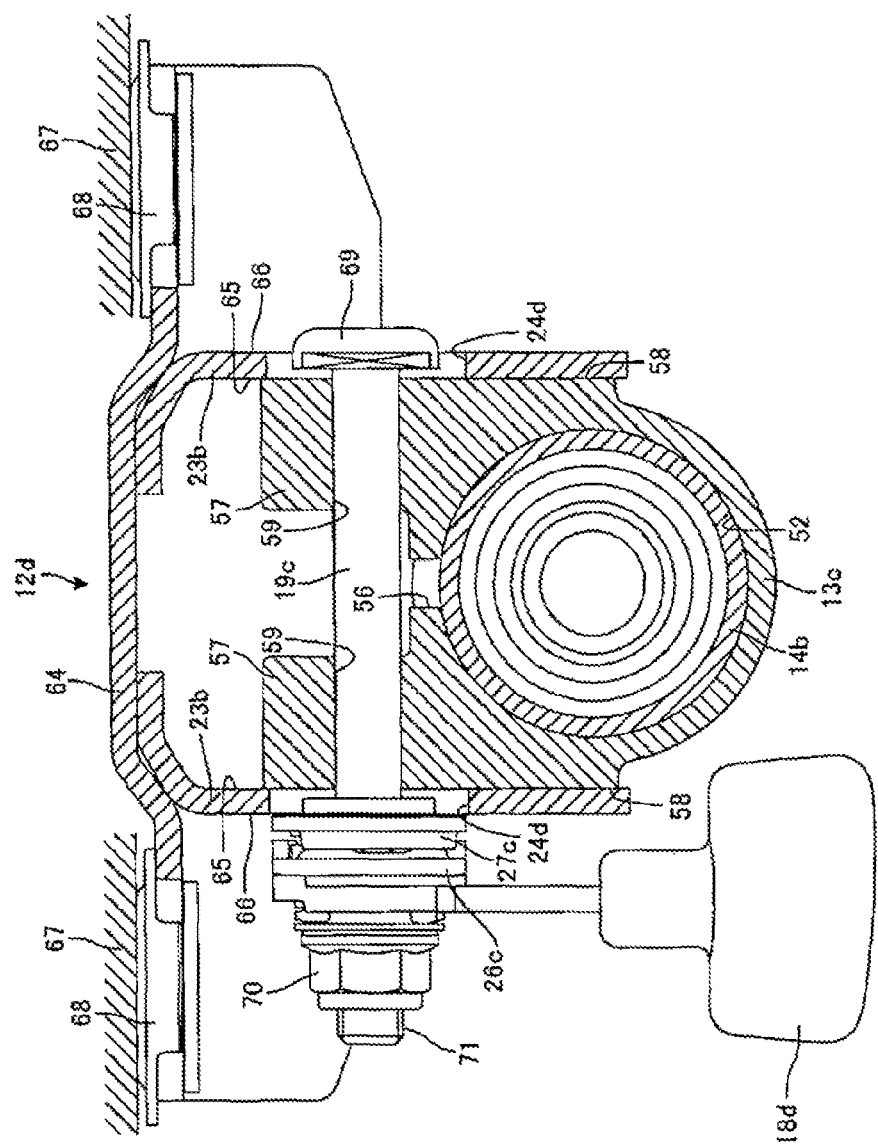
FIG. 16 is a cross-sectional view of section C-C in FIG. 15.
Figure 17:
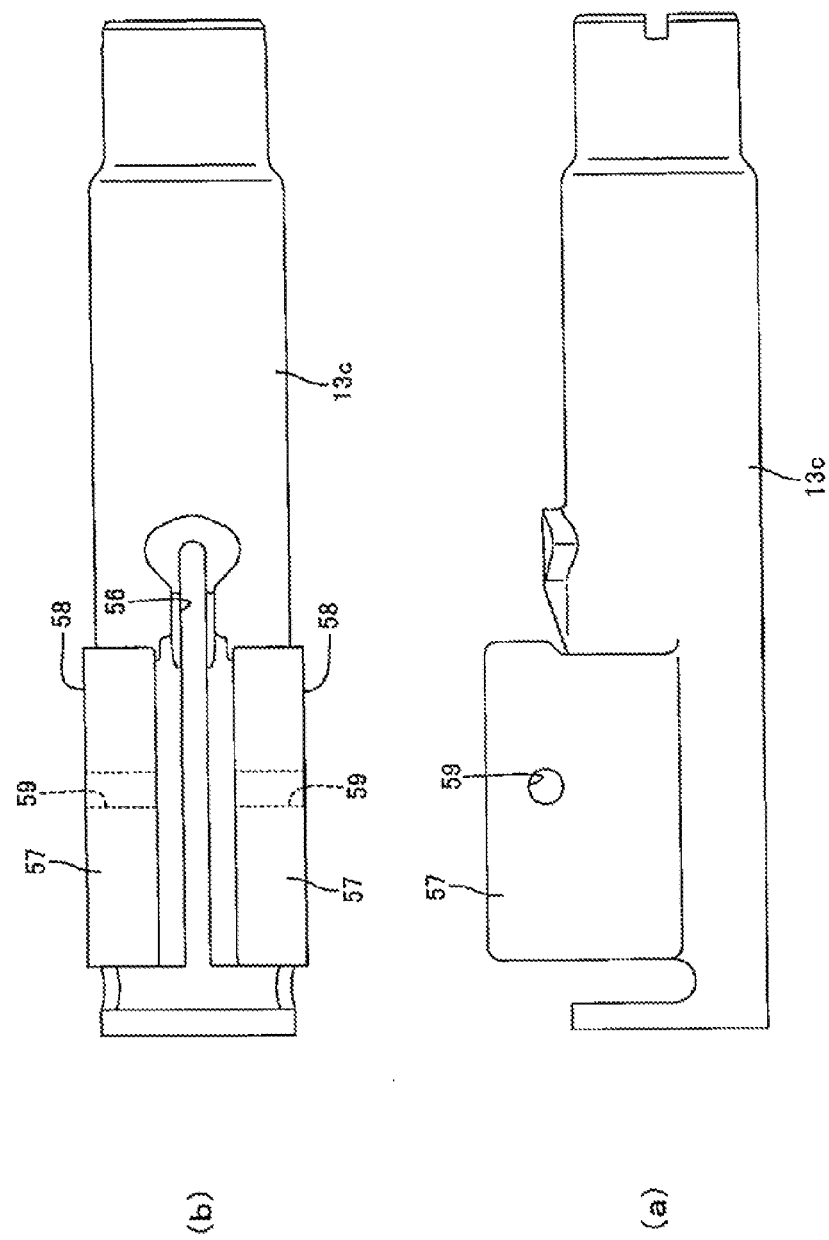
FIG. 17A is a front view of the outer column of the steering column apparatus of the first example of the second embodiment.
FIG. 17B is a top view.
Figure 18:
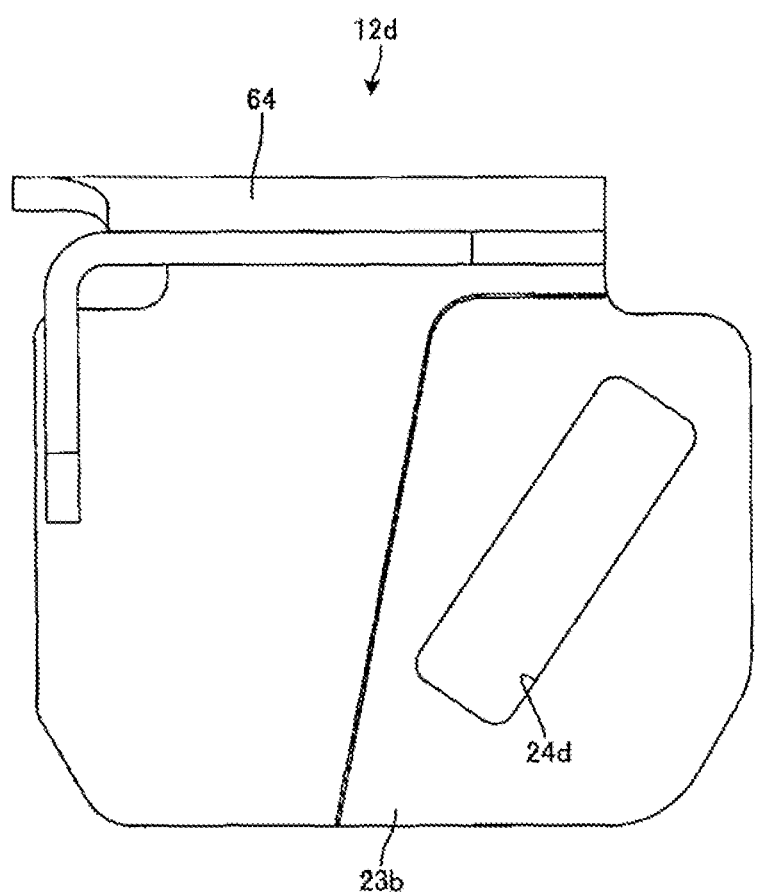
FIG. 18 is a front view of the vehicle installation bracket of the steering column apparatus of the first example of the second embodiment.

As illustrated in FIG. 16 and FIG. 18, the support bracket 12d comprises a top plate 64, and a pair of support plate sections 23b that extend downward from the top plate 64. A displacement bracket (distance bracket) 57 is integrally formed on the outer column 13c and protrudes upward from the outer column 13c. The side surface 58 of the displacement bracket 57 comes in contact with the inside surfaces of the pair of support plate sections (side plates) of the support bracket 12d such that each surface can slide. A slit 56 is formed in the outer column 13c and, as illustrated in FIG. 17 and FIG. 17B, communicates with the inner circumferential surface 52 of the outer column 13c.

Long hole (long tilt adjustment grooves) 24d in the up/down direction are formed in the support plate sections 23b of the support bracket 12d. The long holes 24d in the up/down direction are formed further on the vehicle-top side than the center axis line 48 of the outer column 13c, and are inclined toward the vehicle-rear side from the vehicle-bottom side toward the vehicle-top side. In other words, the long holes 24d up/down direction are formed so as to incline toward the vehicle-rear side more than the circular arc 50 that is centered around the pivot shaft 11.

A round hole 59 that extend in the left/right direction in FIG. 16 is formed as a through hole in the displacement bracket 57 further on the vehicle-top side than the center axis line of the outer column 13c. The rod shaped adjustment rod (tightening rod) 19c, which is a rod shaped member, is inserted from the right side in FIG. 16 through the long holes 24d in the up/down direction and round hole 59.

The long holes 24d in the up/down direction are formed so as to incline toward the vehicle-rear side at an inclination angle α with respect to the plane 49 that is orthogonal to the straight line 51 connecting the center of the pivot shaft (pivot center) and the center of the adjustment rod 19c.

A cylindrical head section 69 is formed on the right end of the adjustment rod 19c. A driven cam (stationary cam) 27c, a drive cam (movable cam) 26c, and an adjustment lever 18d fit in this order around the outside of the left end of the adjustment rod 19c on the outside of the outside surface 66 of the support plate 23b. Moreover, a female screw (not illustrated in the figure) that is formed on the inner-diameter side of a nut 70 is screwed onto a male screw 71 that is formed on the left end of the adjustment rod 19c, to connect the right end surface of the nut 70 with the adjustment lever 18d.

Complementary inclined cam surfaces are formed on the end surfaces of the driven cam 27c and drive cam 26c that face each other, and these surfaces engage with each other. When the adjustment lever 18d that is connected to the surface on the left side of the drive cam 26c is operated by hand, the drive cam 26c rotates with respect to the driven cam 27c.

When the adjustment lever 18d is rotated in the clamping direction, the peak of the inclined cam surface of the drive cam 26c rides up on the peak of the inclined cam surface of the driven cam 27c, and at the same time as the adjustment rod 19c is pulled toward the left side in FIG. 16, the driven cam 27c is pushed to the right side.

The support plate section 23b is pressed toward the right side by the surface on the right end of the driven cam 27, causing the support plate section 23b to deform toward the inside, and the inside surface of the support plate section 23b is strongly pressed against the side surface 58 of the displacement bracket 57. At the same time the head section 69 on the right side presses the outside surface 66 of the support plate section 23b, causing the support plate section 23b to deform toward the inside, and the inside surface 65 of the support plate section 23b is strongly pressed against the side surface 58 of the displacing 57.

In this way, it is possible to firmly tighten the displacement bracket 57 of the outer column 13c by the support bracket 12d. As a result, the width of the slit 56 of the outer column 13c becomes narrow, the inner circumferential surface 52 of the outer column 13c is reduced in diameter, the outer circumferential surface of the inner column 14b is tightly fastened by the inner circumferential surface 52 of the outer column 13c, preventing the outer column 13c from moving relative to the inner column 14b. In this way, the outer column 13c is fastened to the support bracket 12, preventing the outer column 13c from displacing in the tilt direction.

Next, when the driver rotates the adjustment lever 18d in the loosening direction, the support plate sections 23b of the support bracket 12d, having a space in between in the free stat that is wider than the width of the outside of the side surfaces of the displacement bracket 58, elastically return in the direction opposite of the clamped direction.

As a result, the outer column 13c is in a free state with respect to the support plate sections 23b of the support bracket 12d. Therefore, by guiding the adjustment rod 19d in the long holes 24d in the up/down direction causing the adjustment rod 19d to displace in the up/down direction (tilt direction), it is possible to arbitrarily adjust the steering wheel 1 in the tilt direction.

When the vehicle is in a collision with the displacement bracket 57 of the outer column 13c firmly tightened and fastened to the support bracket 12d in the tilt clamp state, the driver collides with the steering wheel 1 due to the inertia force of the collision. As a result, the an impact load is applied toward the vehicle-front side to the long holes 24d in the up/down direction by way of the outer column 13c and adjustment rod 19c.

The long holes 24d in the up/down direction are formed so as to be inclined toward the vehicle-rear side by an inclination angle α with respect to a plane 49 that is orthogonal to the straight line 51 that connects the center of the pivot shaft (pivot center) and the center of the adjustment rod 19c. Therefore, even when an impact load is inputted to the outer column 13c in a direction toward the vehicle-top side, it is possible to prevent having to move the outer column 13c back toward the vehicle-rear side in the axial direction of the column against the collapse load toward the vehicle-rear side in the axial direction of the column that acts at the same time, and thus it is possible for the airbag to effectively receive and stop the driver.

Moreover, a long hole in the forward/backward direction (long telescopic adjustment groove) is not provided in the outer column 13c, and instead a round hole 59 is formed as a through hole. Therefore, the outer column 13c does not begin to move from the support bracket 12d toward the vehicle-front side due to an impact load toward the vehicle-front side during a secondary collision. Consequently, in the support bracket, the friction of the tightened surface (inside surfaces of the support plate sections 23b) that tighten around the outer column 13c is maintained in the static friction state, so there is no decrease in the ability to prevent the outer column 13c from moving to the tilted up side.

Furthermore, the long holes 24d in the up/down direction are located further on the vehicle-top side than the center axis line 48 of the outer column 13c. Therefore, the distance from the installation surface of the support bracket 12d that is installed on the vehicle body 67 to the adjustment rod 19c is short, so there is little possibility for a prying force to occur in the capsule 68 due to an impact load toward the vehicle-front side during a secondary collision, the support bracket 12d to breaks away smoothly from the capsule 68, and it is possible to lessening the impact load that is applied to the driver.

Figure 19:
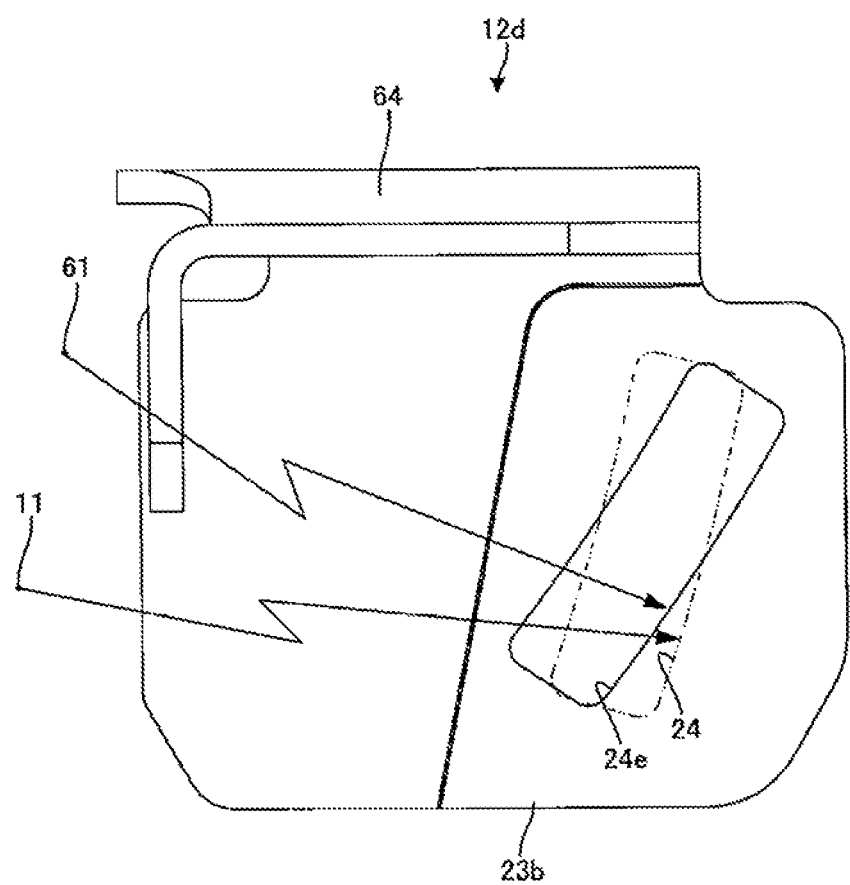
FIG. 19 is a front view of illustrating a variation of the vehicle installation bracket that is applied in the first example of the second embodiment.
Figure 20:
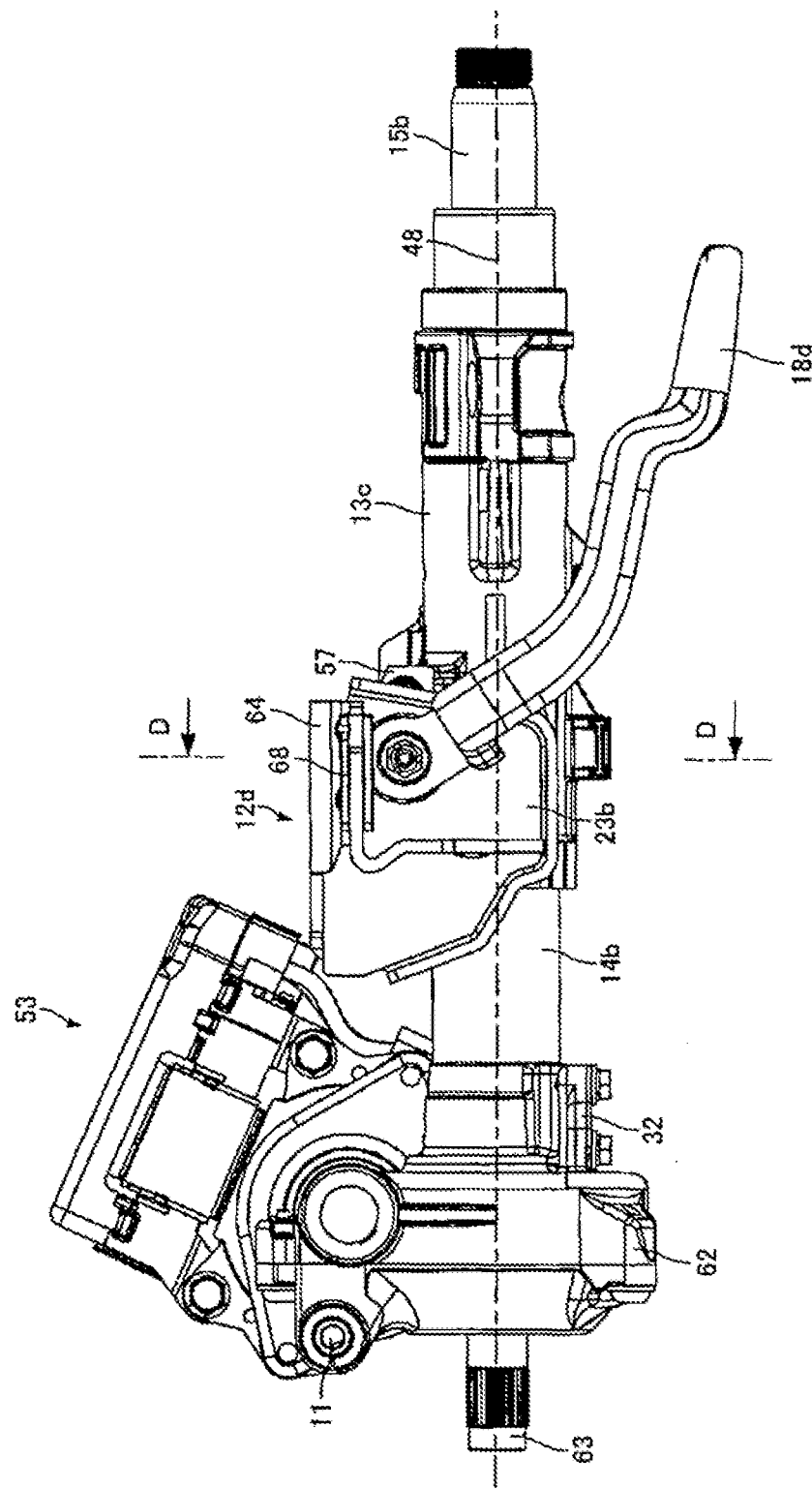
FIG. 20 is a front view illustrating the steering column apparatus of a second example of the second embodiment of the present invention.
Figure 21:
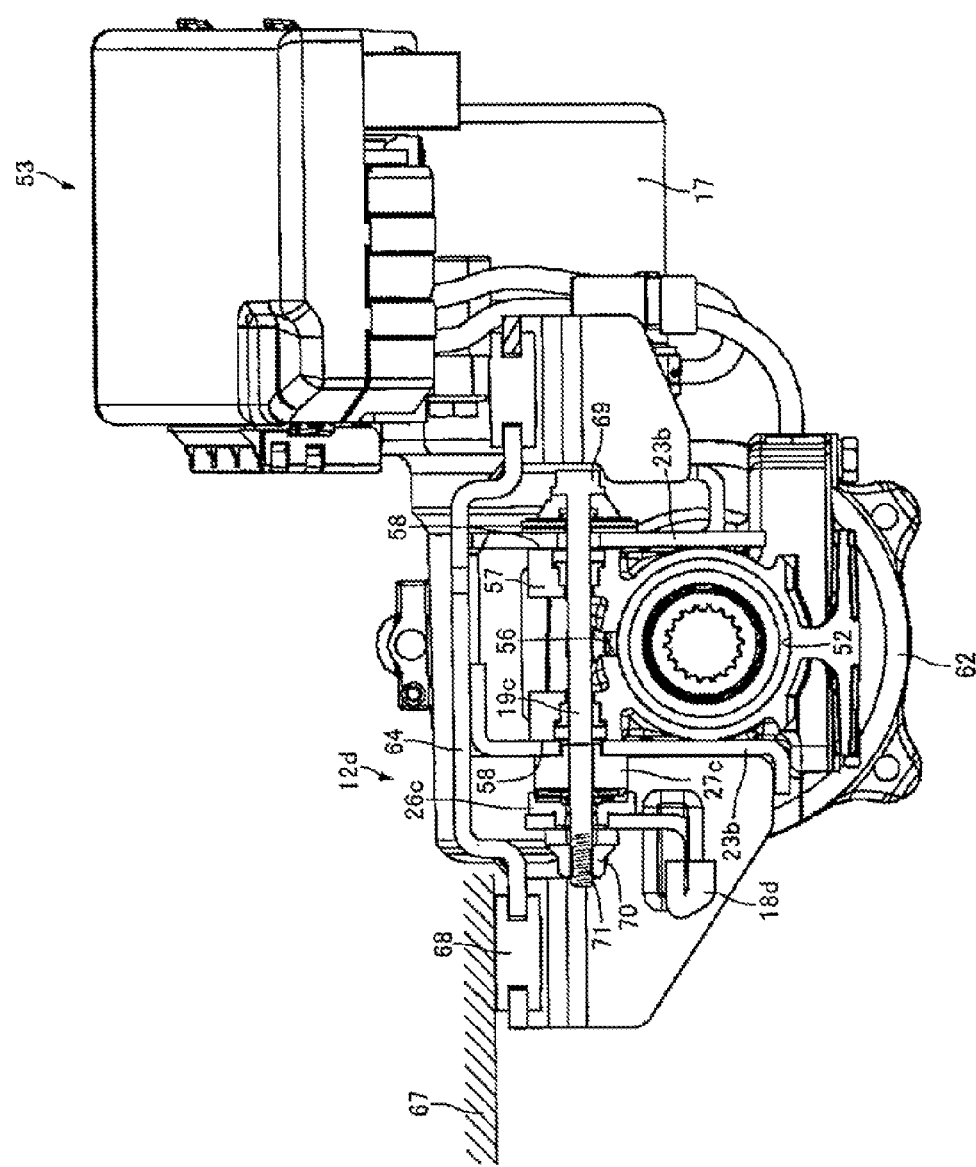
FIG. 21 is a cross-sectional view of section D-D in FIG. 20.
Figure 22:
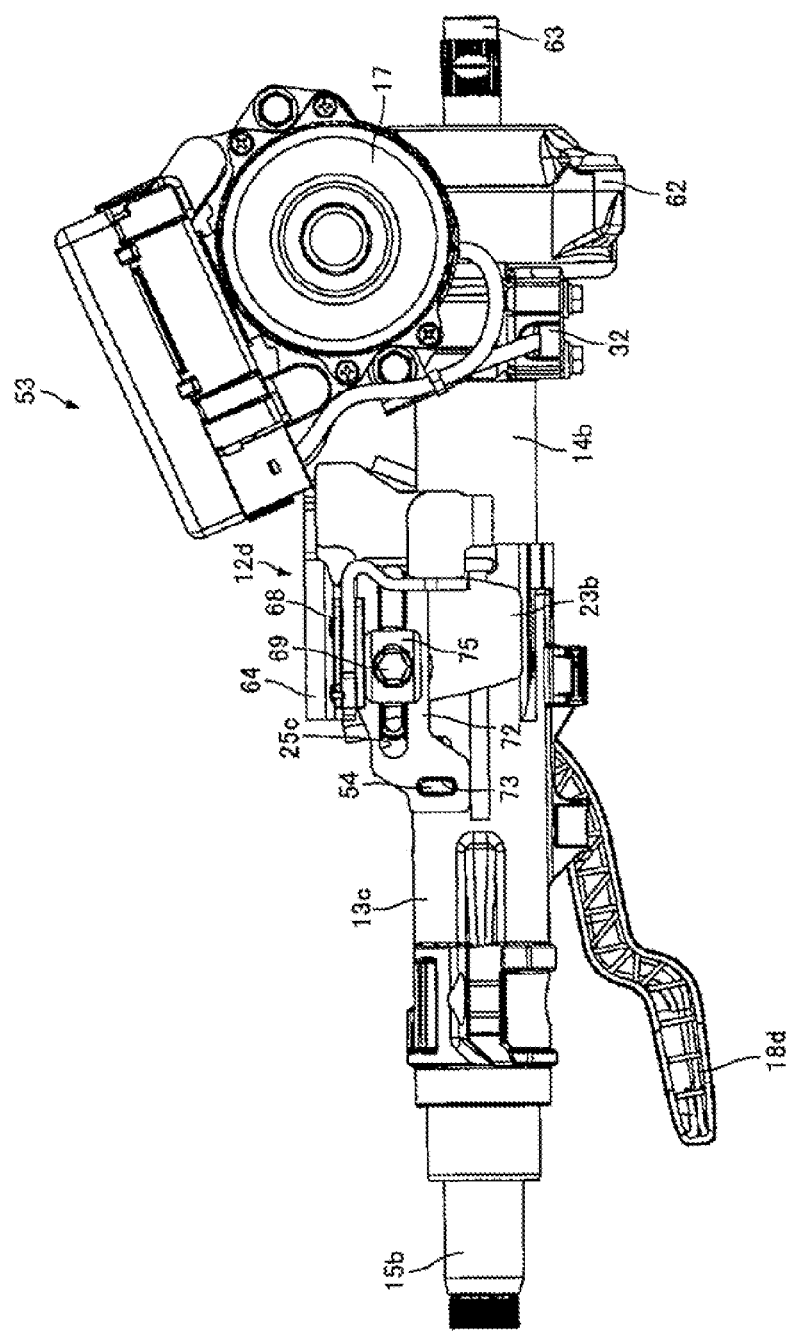
FIG. 22 is a rear view of FIG. 20.
Figure 23:
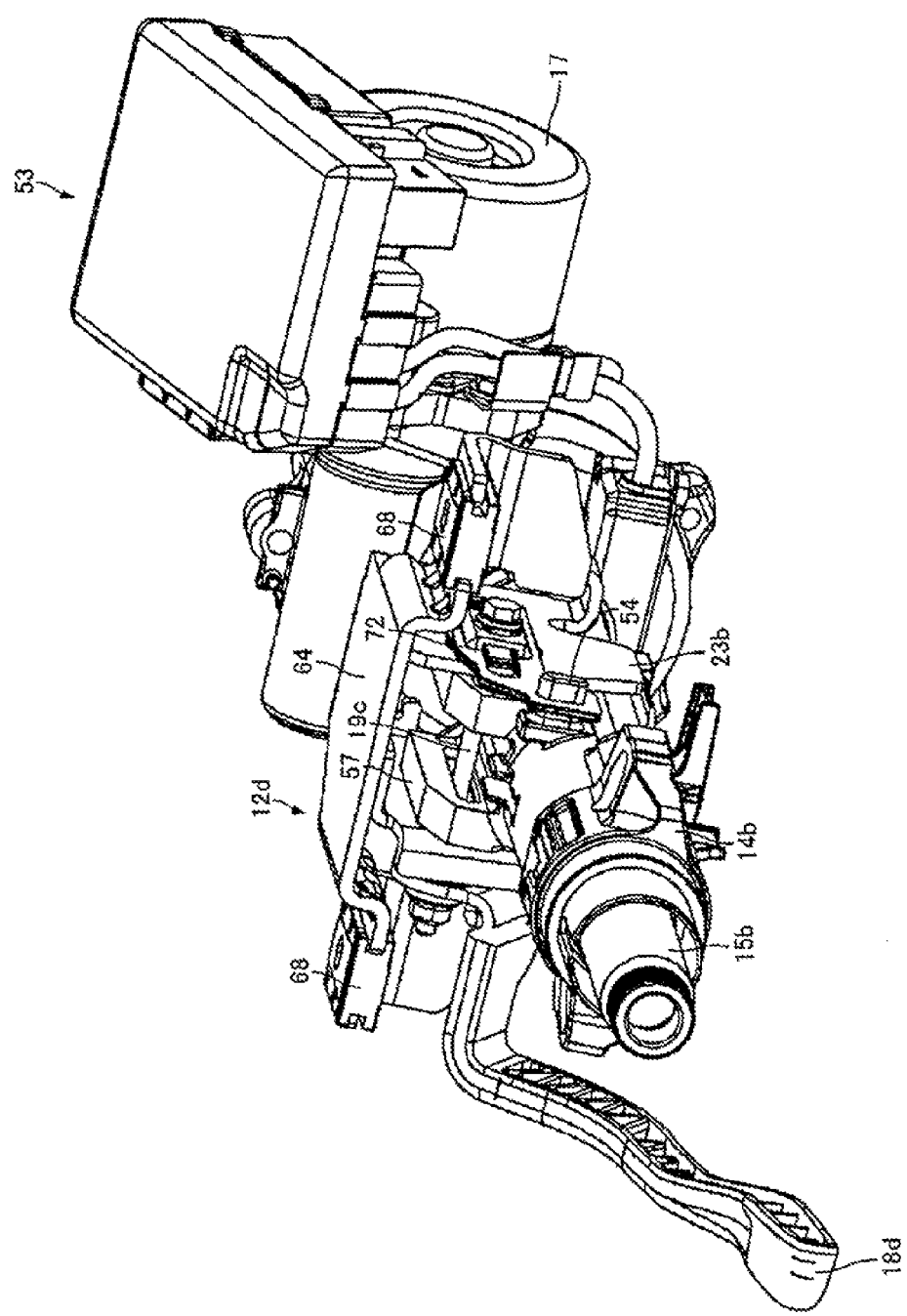
FIG. 23 is a perspective view of the steering column apparatus of the second example of the second embodiment as seen from above on the vehicle-rear side.
Figure 24:
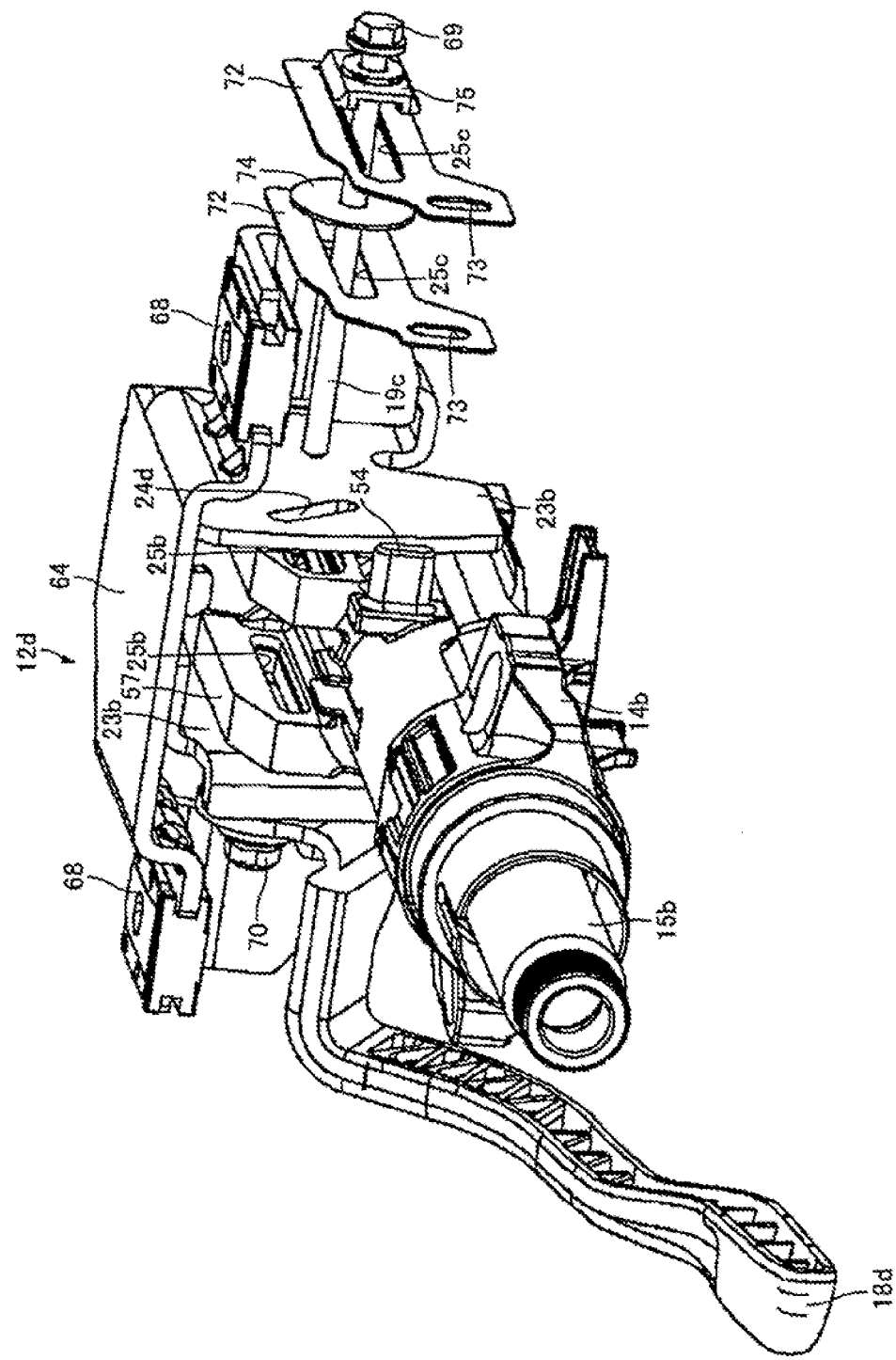
FIG. 24 is an exploded perspective view of part of FIG. 23.
Figure 25:
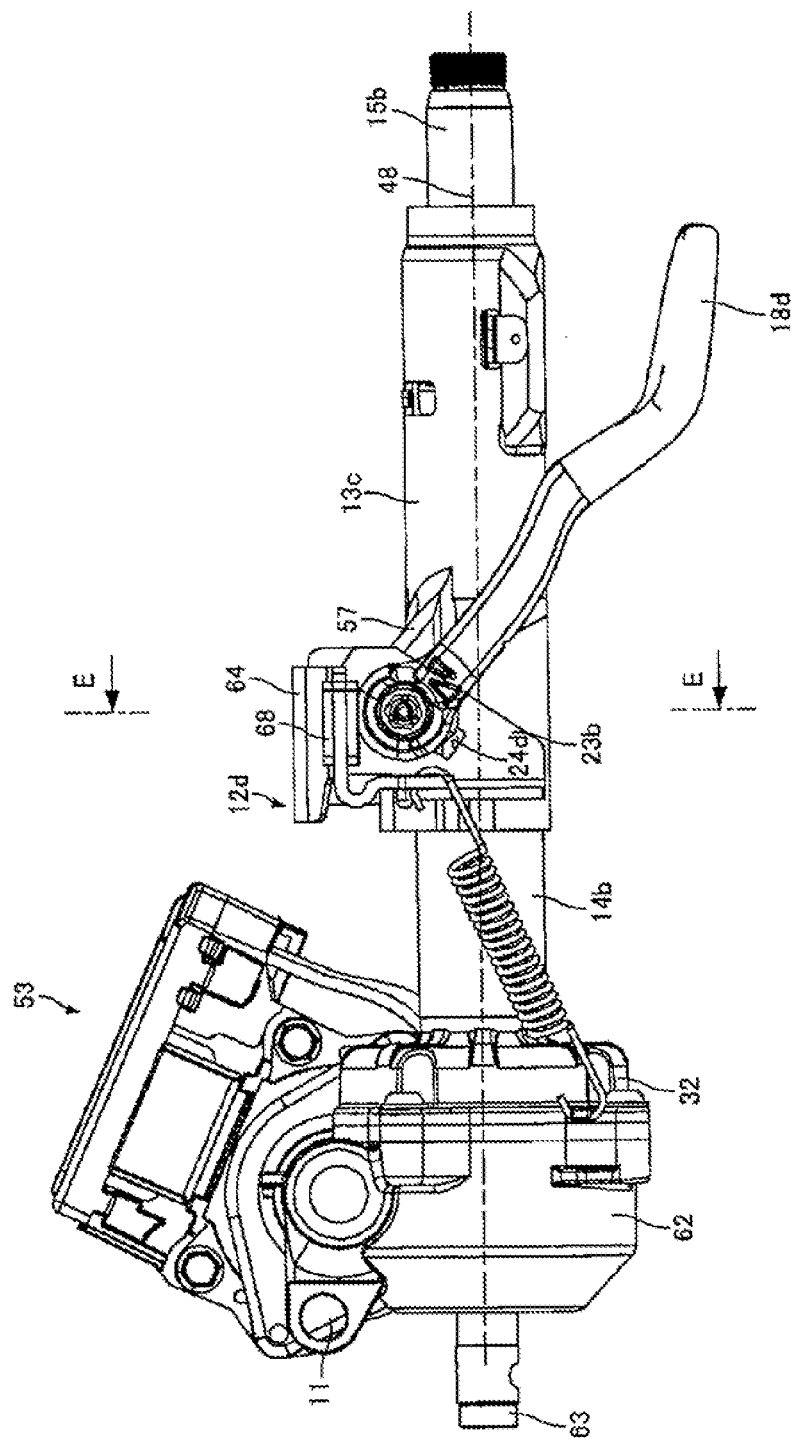
FIG. 25 is a front view illustrating the steering column apparatus of a third example of the second embodiment of the present invention.

Next, a support bracket having variation of the long holes in the up/down direction is explained. FIG. 19 is a front view illustrating a variation of the support bracket. In the first example of the second embodiment, the long holes 24d in the up/down direction are formed in a straight shape, however, the shape is not limited to a straight shape and can be formed in a circular arc shape. In other words, as illustrated by the solid line in FIG. 19, circular arc shaped long holes 24e in the up/down direction.

In FIG. 19, conventional long tilt adjustment grooves 24 indicated by the double-dot-dash lines are formed in a circular arc shape centered around the pivot shaft 11. In this variation, long holes 24e in the up/down direction are formed in a circular arc shape centered around a center 61 that is separated on the vehicle-top side from the pivot shaft 11. Therefore, the long holes 24e in the up/down direction are formed further on the vehicle-top side than the center axis line 48 of the outer column 13c and are inclined toward the vehicle-rear side from the vehicle-bottom side toward the vehicle-top side. In other words, the long holes 24e in the up/down direction are formed so as to incline toward the vehicle-rear side more than the circular arc shaped long holes 24 in the up/down direction that are centered around the pivot shaft 11.

Embodiment 2

Example 2

FIG. 20 to FIG. 24 illustrates a second example of the second embodiment of the present invention. The feature of the steering column apparatus of this example, is that the steering column apparatus also comprises a telescopic function in addition to a tilt function, so a friction plate for telescopic motion for increasing the clamp rigidity in the forward/backward direction (telescopic direction) is installed.

In this example, the end on the vehicle-rear side of the housing 32 of the steering assist section 53 (power assist mechanism) is fastened to the vehicle-front side of the inner column 14b by a pressure fit. The steering assist unit 53 comprises an electric motor 17, a reduction gear box 62, an output shaft 63 and the like. The steering assist unit 53 is supported by the vehicle body 67 by way of the pivot shaft 11 so as to be able to tilt. The steering assist unit 53 detects the torque acting on the inner shaft, drives the electric motor, causes the output shaft 63 to rotate by a required steering assist force, and is connected to the steering gear unit 2 by way of the intermediate shaft 8.

The support bracket 12d comprises a top plate 64 and support plates sections 23b that extend downward from the top plate 64. A displacement bracket (distance bracket) 57 is integrally formed with the outer column 13c and protrudes upward from the outer column 13c. The side surface 58 in the vehicle-width direction of the displacement bracket 57 comes in contact with the inside surfaces of the support plate sections (side plates) 23b of the support bracket 12d. A long hole 25b in the forward/backward direction (long telescopic adjustment groove) is formed in the side surface 58 of the displacement bracket 57, and is formed so as to be long in the axial direction (telescopic position adjustment direction) of the outer column 13c.

Long holes 24d in the up/down direction are formed in the support plate sections 23b of the support bracket 12d. A circular rod shaped adjustment rod 19c, which is a rod shaped member, is inserted from the right side in FIG. 21 through the long holes 24d in the up/down direction and the long hole 25b in the forward/backward direction. The long holes 24d in the up/down direction, as in the first example of the second embodiment, are formed further on the vehicle-top side than the center axis line of the outer column 13c, and are formed so as to incline toward the vehicle-rear side in going from the vehicle-bottom side toward the vehicle-top side.

A cylindrical shaped head section 69 is formed on the right end of the adjustment rod 19. A friction plate for telescopic motion 72, disk shaped friction plate 74, friction plate for telescopic motion 72 and rectangular washer 75 are fitted in this order around on the adjustment rod 19 between the outside surface of the support plate section 23b on the right side and the head section 69. A long hole 25c in the forward/backward direction (long telescopic position adjustment groove) is formed in the friction plate for telescopic motion 72 that elongates in the forward/backward direction of the vehicle, and is formed so as to be long in the axial direction (telescopic position adjustment direction) of the outer column 13c. The adjustment rod 19c is inserted into this long hole 25c in the forward/backward direction. A long hole 73 is formed in the up/down direction of the vehicle in the end on the vehicle-rear side of the friction plate for telescopic motion 72, and a locking protrusion 54, which is formed so as to protrude from the outer column 13d toward the outside in the vehicle-width direction, is inserted into the long hole 73.

A driven cam 27c, a drive came 26c and an adjustment lever 18d are fitted in that order around the left end of the adjustment rod 19c on the outside of the outside surface of the support plate section on the left side. Moreover, a female screw that is formed around the inner-diameter side of a nut 70 is screwed onto a male screw 71 that is formed on the left end of the adjustment rod 19c, connecting the right end surface of the nut 70 with the adjustment lever 18d.

In this example, when the adjustment lever 18d is rotated in the tightening direction, the support plate 23b is pushed to the right side by the surface on the right end of the driven cam 27c, and the support plate section 23b deforms toward the inside, causing the inside surface of the support plate section 23b to be strongly pushed against the side surface 58 of the displacement bracket 57. At the same time, the head section 69 on the right side, by way of the rectangular washer 75, pushes the friction plate for telescopic motion 72, the disk shaped friction plate 74, and the friction plate for telescopic motion 72 against the outside surface of the support plate section 23b, causing the support plate section 23b to deform to the inside, and strongly pushes the inside surface of the support plate section 23b against the side surface 58 of the displacement bracket 57. In this way, it is possible to firmly tighten the displacement bracket 57 of the outer column 13c by the support bracket 12d.

On the other hand, when the adjustment lever 18d is rotated in release direction, the outer column 13c is put into the free state with respect to the support plate sections 23b of the support bracket 12d, and it is possible to arbitrarily adjust the steering wheel 1 in the tilt direction, while at the same time, in this example, by causing the long hole 25b in the forward/backward direction to displace along the adjustment rod 19 in the telescopic direction, it is possible to arbitrarily adjust the telescopic direction of the steering wheel 1.

In this example as well, as in the first example of the second embodiment, the long holes 24d in the up/down direction are formed so as to incline toward the vehicle-rear side going from the vehicle-bottom side toward the vehicle-top side, and even when an impact force is inputted to the outer column 13c in a direction toward the vehicle-top side due to a secondary collision, the outer column 13c must move back toward the vehicle-rear side in the axial direction of the column against the collapse load that acts at the same time in the axial direction of the column toward the vehicle-front side, and thus it is possible to prevent upward displacement of the outer column 13c. Furthermore, in this example, displacement in the telescopic direction of the outer column 13c is prevented by the friction plate for telescopic motion 72 and disk shaped friction plate 74 more strongly than in the first example of the second embodiment, so it is possible to more strongly prevent movement of the outer column 13c toward the vehicle-top side, and it becomes possible for the airbag to effectively receive and stop the driver. The construction and functions of the other parts are the same as in the first example of the second embodiment.

Embodiment 2

Example 3

FIG. 25 to FIG. 29 illustrate a third example of the second embodiment of the present invention. This example is a variation wherein the installation position of the friction plate for telescopic motions in the second example of the second embodiment has been changed, with the feature of this example being the installation of the friction plate for telescopic motions between the inside surfaces of the support plate section (side plate) on the right side and the side surface of the displacement bracket (distance bracket) 57.

As illustrated in FIG. 25 to FIG. 29, a cylindrical head section is formed on the right end of the adjustment rod 19c. A friction plate for telescopic motion 76, a rectangular friction plate 78 and friction plate for telescopic motion 76 are fitted in that order between the inside surface 65 of the support plate section 23b on the right side and the side surface 58 of the displacement bracket 57, and furthermore a rectangular washer 79 fits inside the long tilt adjustment grooves 24, and the head section 69 comes in contact with the outside surface of the support plate section 23b on the right side.

Figure 26:
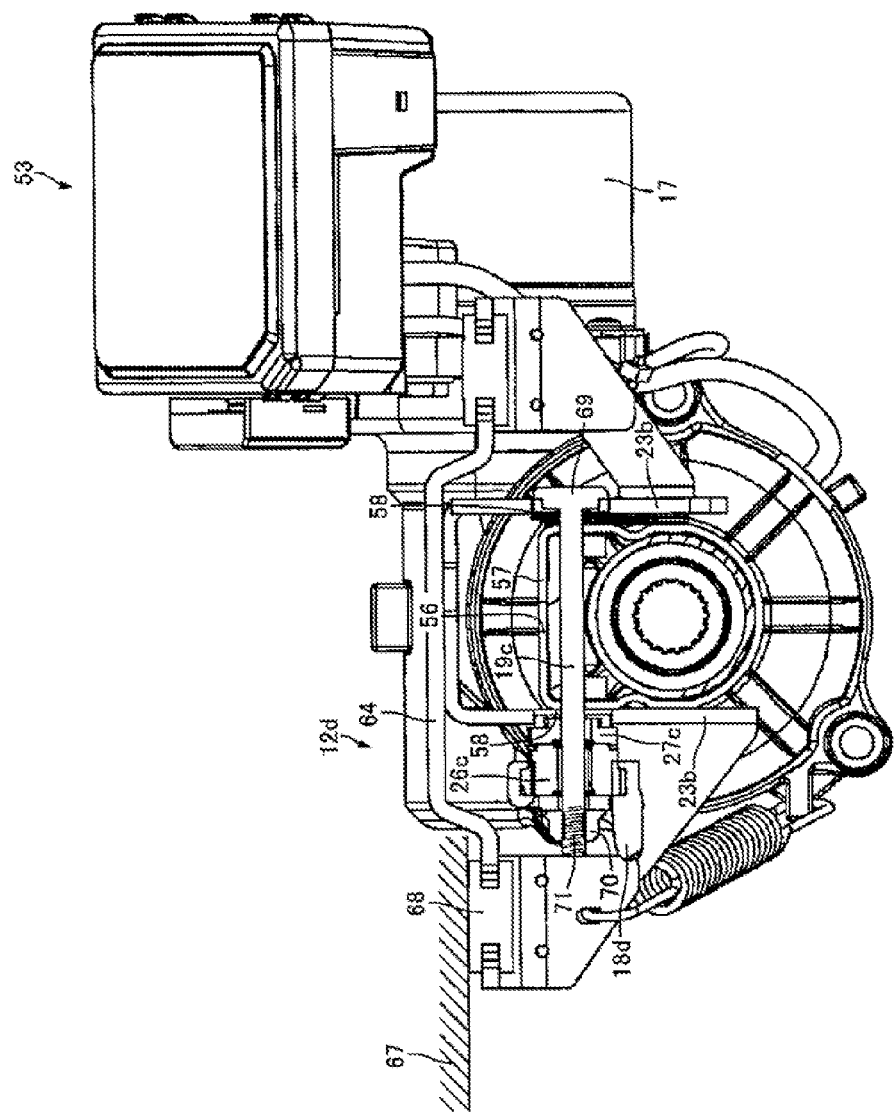
FIG. 26 is a cross-sectional view of section E-E of FIG. 25.
Figure 27:
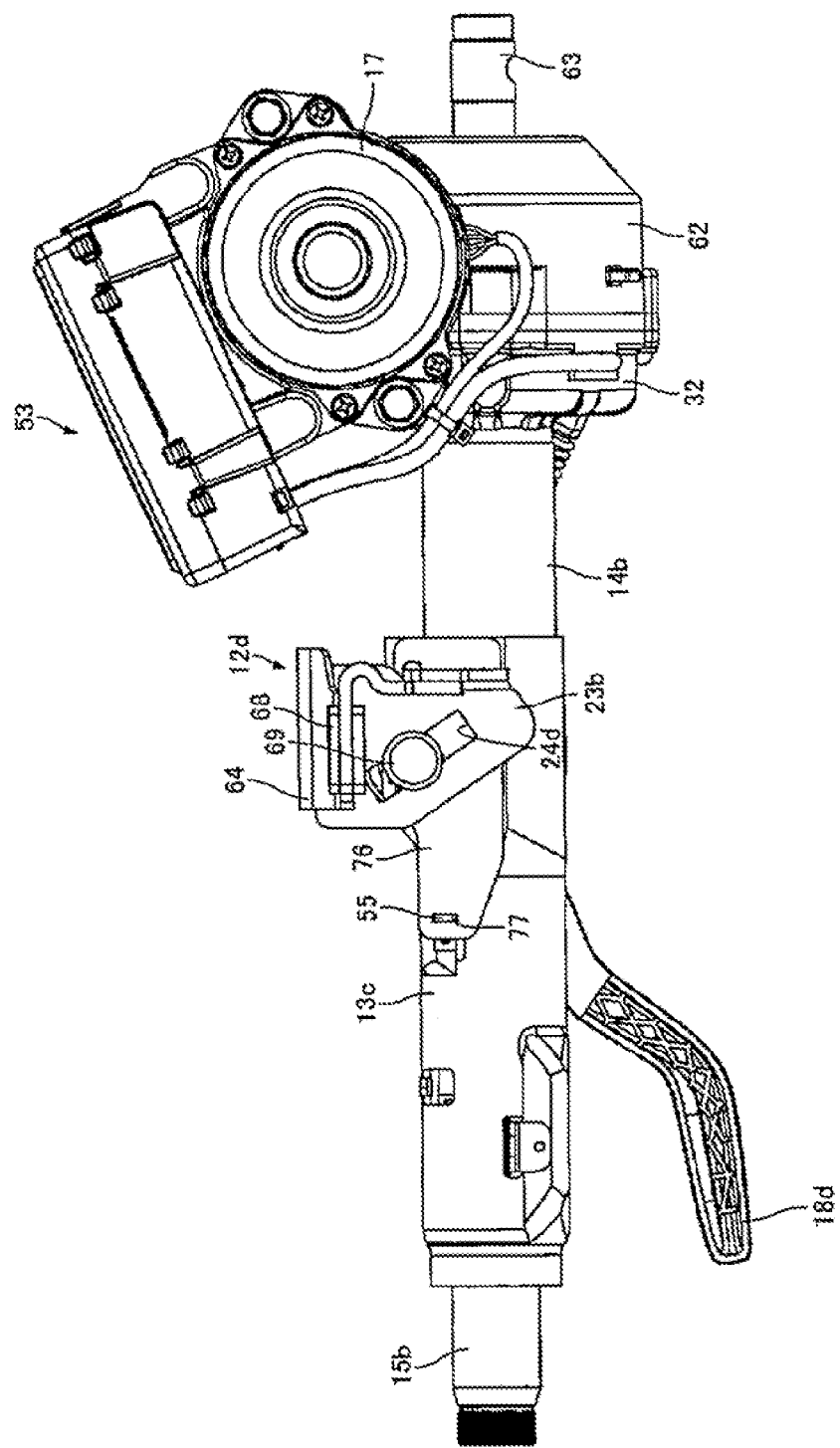
FIG. 27 is a rear view of FIG. 26.
Figure 28:
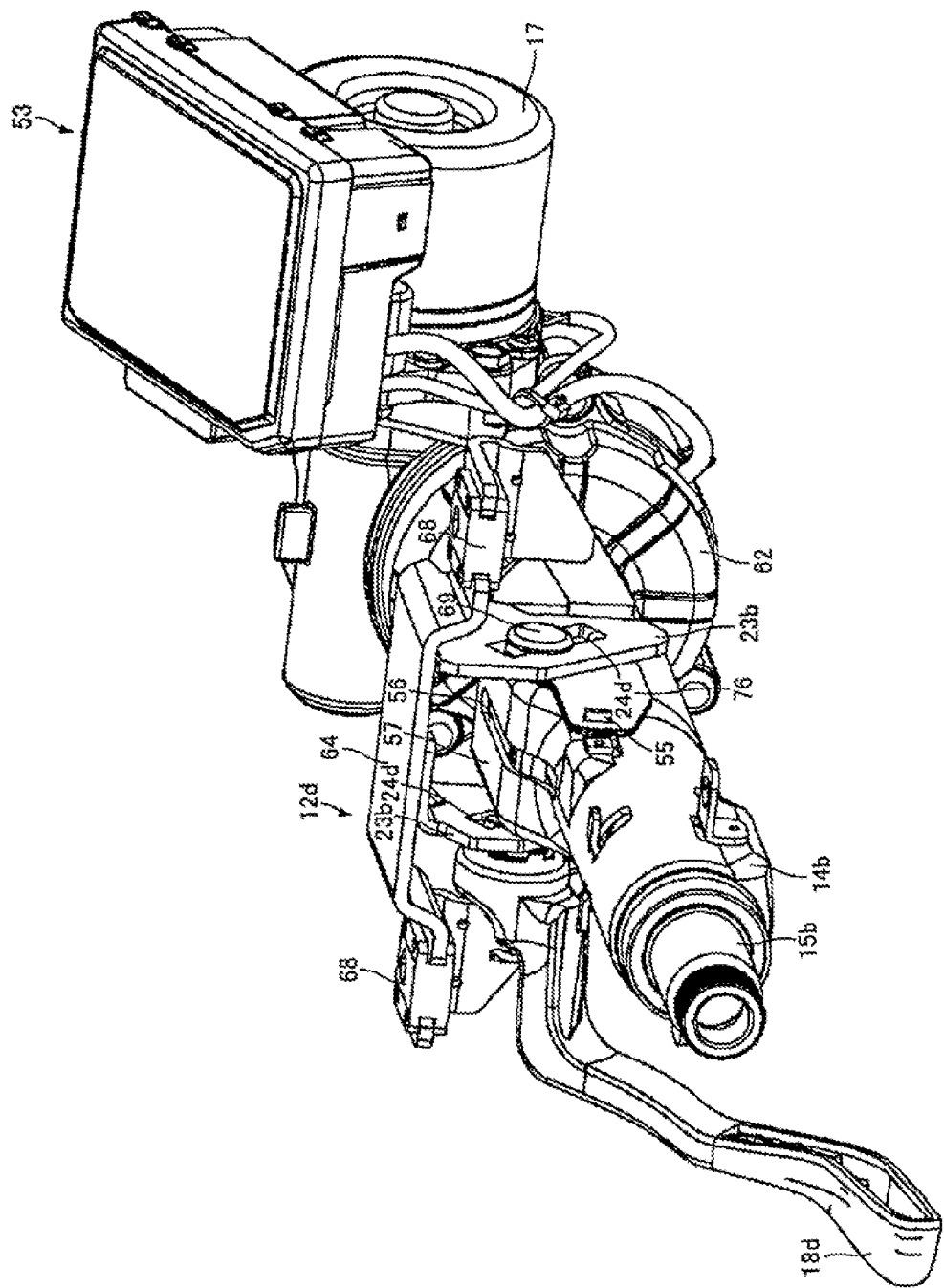
FIG. 28 is a perspective view of the steering column apparatus of the third example of the second embodiment as seen from above the vehicle-rear side.
Figure 29:
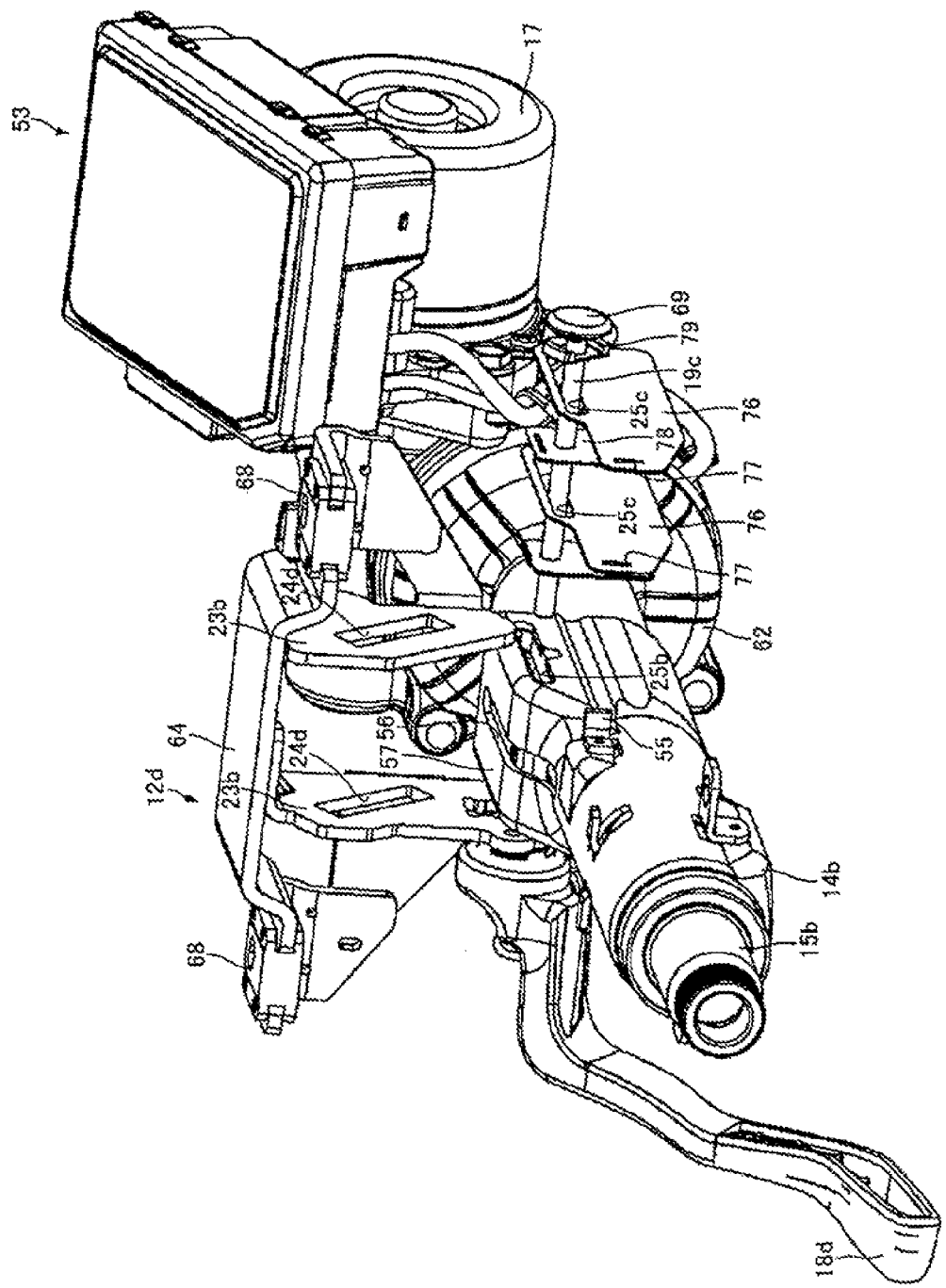
FIG. 29 is an exploded perspective view of part of FIG. 28.

When the adjustment lever 18d is rotated in the tightening direction, the peak on the inclined cam surface of the drive cam 26c rides up on the peak of the inclined surface of the driven cam 27c, and as the adjustment rod 19c is pulled to the left side in FIG. 26, the driven cam 27c is pushed to the right side of FIG. 26. When this happens, the support plate section 23b is pushed to the right side by the surface on the right end of the driven cam 27, the support plate section 23b deforms toward the inside, and the inside surface of the support plate section 23b is strongly pushed against the side surface 58 of the displacement bracket 57. At the same time, the head section on the right side pushes the outside surface of the support plate section 23b, and strongly pushes the friction plate for telescopic motion 76, the rectangular friction plate 78, and the friction plate for telescopic motion 76 against the side surface 58 of the displacement bracket 57.

In this way it is possible to firmly tighten the displacement bracket 57 of the outer column 13c in the support bracket 57 of the outer column 13c. Therefore, as in the second example of the second embodiment, the outer column 13c is fastened to the support bracket 12d, and the displacement of the outer column 13c in the tilt direction and in the telescopic direction is prevented. The construction and functions of the other parts are the same as in the first example and second example of the second embodiment.

In the explanation of the present invention, examples of applying the invention to a steering apparatus wherein the inner column is located on the vehicle-front side and the outer column is located on the vehicle-rear side were explained, however, the invention can also be applied to a steering apparatus wherein the inner column is located on the vehicle-rear side and the outer column is located on the vehicle-front side.

INDUSTRIAL APPLICABILITY

The present invention can be widely applied to electric power steering apparatuses comprising at least a tilt mechanism and a mechanism for allowing the steering column to displace in the forward direction during a secondary collision. Moreover, the invention can also be suitably applied to electric power steering apparatuses that further comprise a telescopic mechanism. In this way, the present invention greatly contributes to more completely protecting the driver operating the electric power steering apparatus, and improving the feeling during use.

EXPLANATION OF THE REFERENCE NUMBERS

1 Steering wheel
2 Steering unit
3 Input shaft
4 Tie rod
5, 5a, 5b Steering shaft
6, 6a to 6c Steering column
7 Universal joint
8 Intermediate shaft
9 Universal joint
10 Vehicle body
11 Pivot shaft
12, 12a to 12d Support bracket
13, 13a to 13c Outer column
14, 14a, 14b Inner column 15, 15a, 15b Outer shaft
16, 16a, 16b Inner shaft
17 Electric motor
18, 18a to 18d Adjustment lever
19, 19a to 19c Adjustment rod
20, 20a, 20b Cam apparatus
21 Cam member
22 Displacement bracket
23, 23a, 23b Support plate section
24, 24a to 24e Long hole in the up/down direction
25, 25a to 25d Long hole in the forward/backward direction
26, 26a to 26c Drive cam
27, 27a to 27c Driven cam
28 Convex section
29, 29a Concave section
30 Stepped section
31 Through hole
32 Housing
33 Balance spring
34 Locking capsule
35 Energy absorbing member
36 Lever section
37 Convex section on the drive side
38 Convex section on the driven side
39 Stopper surface
40, 40a Locking arm
41, 41a Locking piece
42, 42a Locking groove
43 Flat section
44a, 44b Inclined surface section
45 Convex section
46 Suspended plate section
47 Stepped stopper section
48 Center axis line
49 Orthogonal plane
50 Circular arc
51 Straight line
52 Inner circumferential surface
53 Steering assist unit
54 Locking protrusion
55 Locking protrusion
56 Slit
57 Distance bracket
58 Side surface
59 Round hole
60 Lower bracket
61 Center
62 Reduction gear box
63 Output shaft
64 Top plate
65 Inside surface
66 Outside surface
67 Vehicle body
68 Capsule
69 Head section
70 Nut
71 Male screw
72 Friction plate for telescopic motion
73 Long hole
74 Disk shaped friction plate
75 Rectangular washer
76 Friction plate for telescopic motion
77 Long hole
78 Rectangular friction plate
79 Rectangular washer

What is claimed is:

1. A steering column apparatus configured for installation in a vehicle body defining forward, rearward, width, upward, and downward directions, the steering column apparatus comprising:

a steering column having a center axis and a front end section disposed in the forward direction of the vehicle body, a rear end section disposed in the rearward direction of the vehicle body, a middle section therebetween, and a center axis therethrough, the steering column being supported by the vehicle body so as to be able to pivot and displace around a pivot shaft that is arranged in the width direction of the vehicle body, the steering column supporting a steering shaft on which a steering wheel is mounted such that the steering shaft can rotate;

a displacement bracket fastened to an uppermost location in the upward direction of the middle section of the steering column and comprising a through hole formed in the width direction of the vehicle body;

a support bracket comprising a pair of support plate sections and a pair of long holes having a longitudinal axis in the upward and downward directions of the vehicle body that are formed in positions of the pair of support plate sections that are aligned with the through hole of the displacement bracket, the support bracket being supported by the vehicle body and having the displacement bracket held between the pair of support plate sections;

a rod shaped member that is inserted through the through hole and the pair of long holes in the upward and downward directions so as to be capable of displacing along the long holes in the upward and downward directions, the rod shaped member located further in the upward direction of the vehicle body than the center axis of the steering column;

an adjustment lever that comprises a base end section that is connected to an end section of the rod shaped member, and a main portion that has a tip end section that is separated from the base end section, the adjustment lever being able to rotate the rod shaped member; and a cam apparatus connected to the end section of the rod shaped member and configured to expand or contract in the width direction of the vehicle body according to the operation of the adjustment lever and thereby cause a space between the pair of support plate sections to expand or contract, wherein the steering column is supported by the vehicle body such that the steering wheel is configured to be adjustable between an uppermost position disposed in the upward direction of the vehicle body and a lowermost position disposed in the downward direction of the vehicle body, and so that the steering column is configured to displace in the forward direction of the vehicle body in the event of a secondary collision, wherein the longitudinal axis of the long holes is inclined at a specified angle with respect to a virtual plane that is orthogonal to a center axis of the steering column, and elongating in the downward and forward directions of the vehicle body the specified angle being larger than an inclination angle of the axis of the steering column with respect to the forward and rearward directions of the vehicle body regardless of a position of the steering wheel between the uppermost position and the lowermost position thereof, a stepped stopper section located on an outside surface of one of the pair of support plate sections nearest the adjustment lever, and a locking arm located on the base end section of the adjustment lever and comprising a tip end section configured so that when the adjustment lever is positioned such that the position of the steering wheel is maintained, the tip end section of the locking arm comes in contact with the stepped stopper section, and when the adjustment lever is positioned so that the position of the steering wheel can be adjusted, the tip end section of the locking arm is separated from the stepped stopper section, wherein the stepped stopper section extends in a direction that is inclined at a specified angle with respect to the longitudinal axis of the long holes and by changing the position on the stepped stopper section and thereby changing where the tip end section of the locking arm comes in contact with the steeped stopper section depending on the position of the steering wheel, the distance between the steering column and the tip end section of the adjustment lever being kept constant when the adjustment lever is positioned so that the position of the steering wheel can be maintained regardless of the position of the steering wheel.

2. The steering column apparatus according to claim 1, further comprising:

a flat section on the outside surface of the support plate section with which the tip end section of the locking arm lightly comes in contact due to an elastic force of the locking arm when the adjustment lever is positioned such that the position of the steering wheel can be adjusted;

a convex section on the outside surface of the support plate section that faces the adjustment lever between the stepped stopper section and the flat section; and a locking groove that the tip end section of the locking arm is configured to engage with located between the convex section and the stepped stopper section, wherein the convex section comprises at least two surfaces inclined in the direction of rotation of the locking arm for promoting the tip end section of the locking arm to ride up on the convex section.

3. The steering column according to claim 1, wherein the rigidity of the locking arm is less than the rigidity of the main portion of the adjustment lever.

* * * * *